United States Patent
Jung et al.

(10) Patent No.: US 7,446,817 B2
(45) Date of Patent: Nov. 4, 2008

(54) METHOD AND APPARATUS FOR DETECTING TEXT ASSOCIATED WITH VIDEO

(75) Inventors: Cheolkon Jung, Gyeonggi-do (KR); Jiyeun Kim, Seoul (KR); Youngsu Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 663 days.

(21) Appl. No.: 11/056,361

(22) Filed: Feb. 14, 2005

(65) Prior Publication Data

US 2005/0196043 A1 Sep. 8, 2005

(30) Foreign Application Priority Data

Feb. 18, 2004 (KR) .............. 10-2004-0010660

(51) Int. Cl.
*H04N 7/08* (2006.01)
*G06K 9/72* (2006.01)
(52) U.S. Cl. ..................... 348/468; 382/229
(58) Field of Classification Search ............ 348/468, 348/461; 381/176, 229, 321
See application file for complete search history.

(56) References Cited

U.S. PATENT DOCUMENTS

| | | | | |
|---|---|---|---|---|
| 5,703,655 | A * | 12/1997 | Corey et al. ............ | 348/468 |
| 6,101,274 | A * | 8/2000 | Pizano et al. ........... | 382/176 |
| 6,185,329 | B1 * | 2/2001 | Zhang et al. ............ | 382/176 |
| 6,470,094 | B1 * | 10/2002 | Lienhart et al. ......... | 382/176 |
| 6,754,389 | B1 * | 6/2004 | Dimitrova et al. ........ | 382/224 |
| 6,937,766 | B1 * | 8/2005 | Wilf et al. .............. | 382/229 |
| 7,031,553 | B2 * | 4/2006 | Myers et al. ............ | 382/289 |
| 7,171,046 | B2 * | 1/2007 | Myers et al. ............ | 382/187 |
| 2002/0159636 | A1 | 10/2002 | Lienhart et al. | |
| 2003/0113015 | A1 * | 6/2003 | Tanaka .................. | 382/176 |

(Continued)

FOREIGN PATENT DOCUMENTS

WO        WO 01/37212  A1    5/2001

(Continued)

OTHER PUBLICATIONS

Rainer Lienhart, Video OCR: A Survey and Practitioner's Guide, pp. 155-183.

(Continued)

*Primary Examiner*—Paulos M Natnael
(74) *Attorney, Agent, or Firm*—Staas & Halsey LLP

(57) ABSTRACT

A method and apparatus for detecting text associated with video are provided. The method of detecting the text of the video includes reading a t-th frame (where t is a positive integer) among frames forming the video as a current frame, determining whether there is a text area detected from a previous frame which is a (t−N)-th (where N is a positive integer) frame among the frames forming the video, in the current frame, and upon determining that there is no text area detected from the previous frame in the current frame, detecting the text area in the entire current frame. Upon determining that there is the text area detected from the previous frame in the current frame, the text area is detected from a remaining area obtained by excluding from the current frame an area corresponding to the text area detected from the previous frame. Whether there is a text area in a next frame which is a (t+N)-th frame among the frames forming the video is verified.

42 Claims, 19 Drawing Sheets

U.S. PATENT DOCUMENTS

2004/0001634 A1 * 1/2004 Mehrotra .................... 382/232
2005/0201619 A1 * 9/2005 Sun et al. .................... 382/176

OTHER PUBLICATIONS

Boon-Lock Yeo, Visual Content Highlighting via Automatic Extraction of Embedded Captions on MPEG Compressed Video, SPIE vol. 2668, pp. 38-47.

Rainer Lienhart, Video OCR: A Survey and Practitioner's Guide, pp. 155-183, Oct. 13, 2003.

Boon-Lock Yeo, Visual Content Highlighting via Automatic Extraction of Embedded Captions on MPEG Compressed Video, SPIE vol. 2668, pp. 38-47, 1996.

Search Report issued by the European Patent Office on May 30, 2005.

* cited by examiner

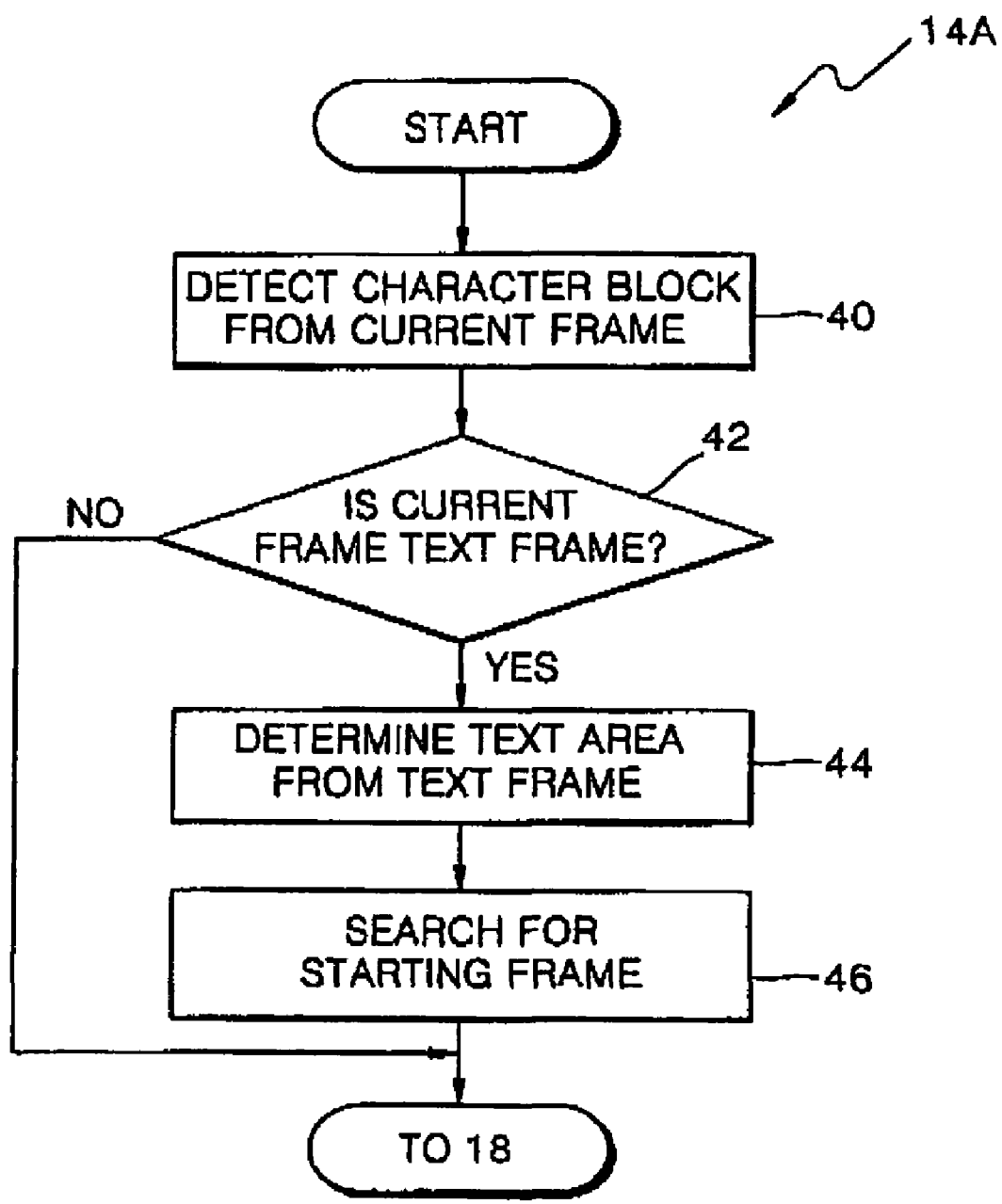

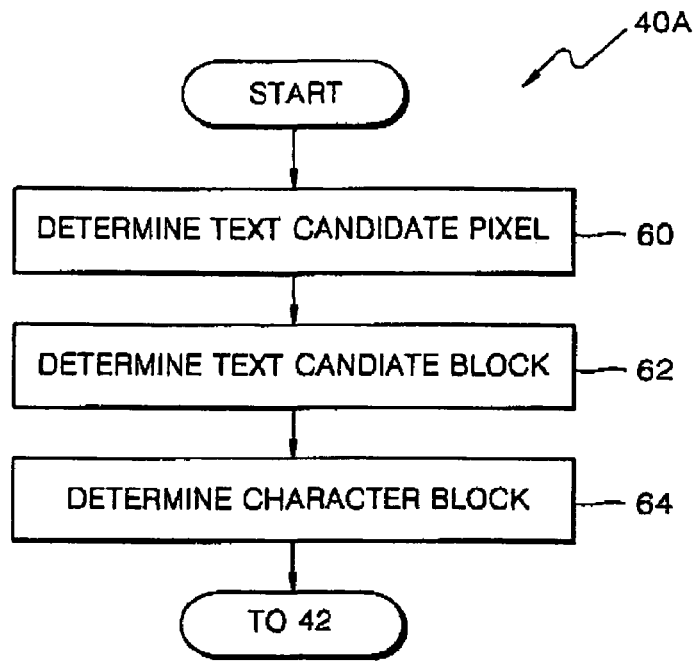
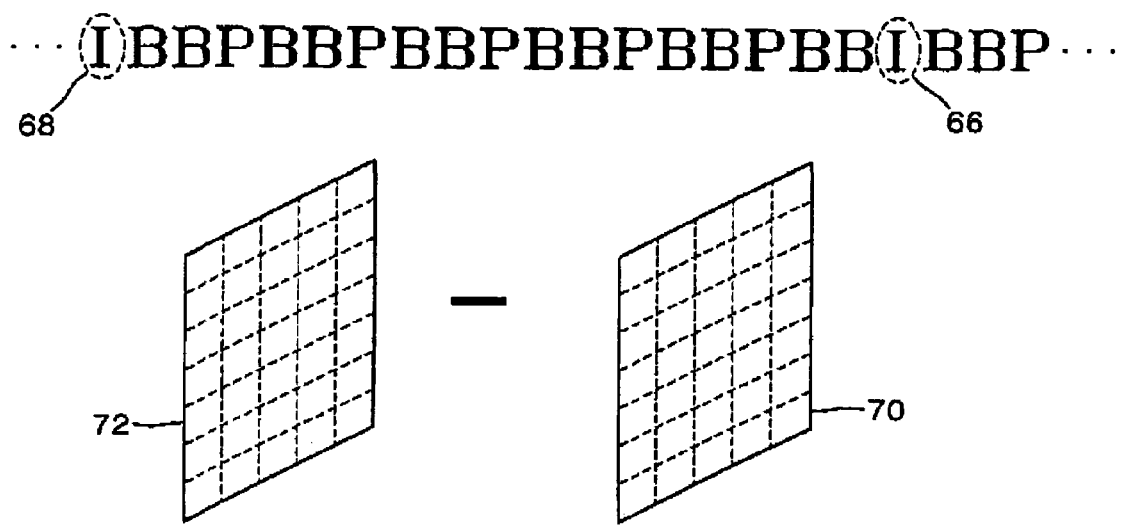

METHOD AND APPARATUS FOR DETECTING TEXT ASSOCIATED WITH VIDEO

CROSS-REFERENCE TO RELATED APPLICATIONS

This application claims the benefit from Korean Patent Application No. 2004-10660, filed on Feb. 18, 2004, in the Korean Intellectual Property Office, the disclosure of which is hereby incorporated by reference.

BACKGROUND OF THE INVENTION

1. Field of the Invention

The present invention relates to video processing, and more particularly, to a method and apparatus for detecting text associated with video.

2. Description of the Related Art

Conventional methods of detecting text associated with video may be classified into methods detecting text associated with video in a compressed domain and methods of detecting text associated with video in a uncompressed domain.

A conventional method of detecting the text associated with video in the compressed domain is disclosed in U.S. Pat. No. 6,185,329, entitled "Automatic Caption Text Detection and Processing for Digital Images." In this method, since the text is detected in the compressed domain, while it is possible to quickly detect the text, limited information is provided from the compressed domain, and thus the text cannot be accurately detected.

Conventional methods of detecting text associated with video in the uncompressed domain are disclosed in U.S. Pat. No. 6,101, 274, entitled "Method and Apparatus for Detecting and Interpreting textual Captions in Digital Video Signals" and in U.S. Pat. No. 6,470,094, entitled "Generalized Text Localization in Images". With these methods, while it is possible to detect the text with some degree of accuracy, due to the time required to uncompress a frame, the speed at which the text is detected is reduced. Furthermore, it is difficult to detect the text in an environment in which there is a text area in a complicated background or when a background area quickly changes.

SUMMARY OF THE INVENTION

The present invention provides a method of detecting text associated with video in which the text in the video is accurately and quickly detected while not being affected by a given environment.

The present invention also provides an apparatus for detecting text associated with video in which the text in the video is accurately and quickly detected while not being affected by a given environment.

According to an aspect of the present invention, a method of detecting text associated with video includes reading a t-th frame (where t is a positive integer) of frames forming the video as a current frame, determining whether there is a text area detected from a previous frame which is a (t−N)-th (where N is a positive integer) frame of the frames forming the video in the current frame, upon determining that there is no text area detected from the previous frame in the current frame detecting text area in the entire current frame, and upon determining that there is text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video.

According to another aspect of the present invention, an apparatus for detecting text associated with video includes a frame inputting unit reading a t-th frame (where t is a positive integer) among frames forming the video as a current frame, a text area checking unit checking whether there is a text area detected from a previous frame which is a (t−N)-th (where N is a positive integer) frame among the frames forming the video in the current frame and outputting the checked results as a first control signal, a first text area detecting unit detecting text area from the current frame in response to the first control signal, a second text area detecting unit detecting text area from a remaining area obtained by excluding an area corresponding to the text area detected from the previous frame from the current frame in response to the first control signal; and a text area verifying unit verifying whether there is a text area in a next frame which is a (t+N)-th frame among the frames forming the video.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart illustrating operation 14 of FIG. 1 according to an embodiment of the present invention;

FIG. 3 is a flowchart illustrating operation 40 of FIG. 2 according to an embodiment of the present invention;

FIG. 4 is a view illustrating a group of pictures (GOPs) to assist in an explanation of operation 60 of FIG. 3;

DETAILED DESCRIPTION OF THE PREFERRED EMBODIMENTS

Figure 1:
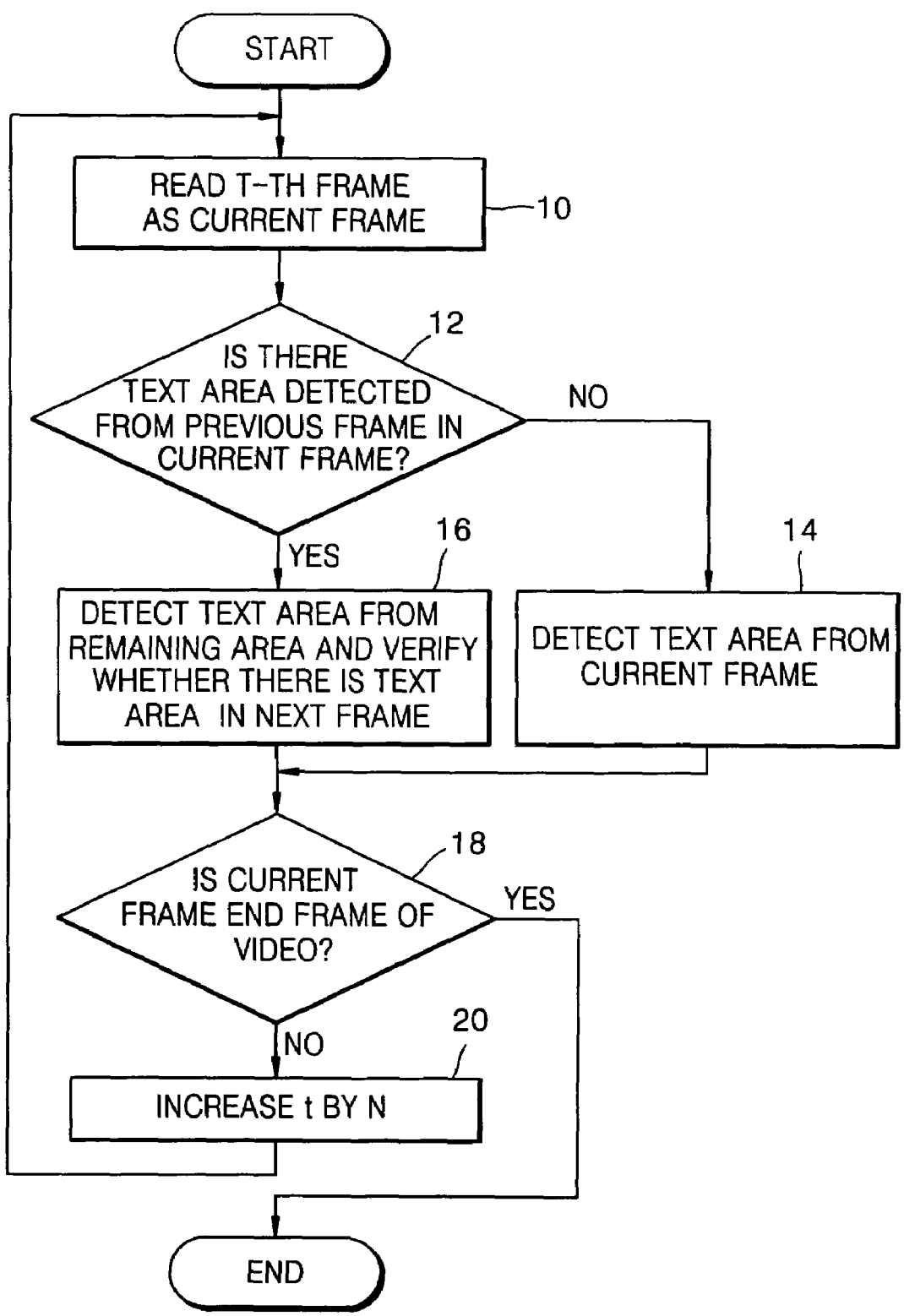
FIG. 1 is a flowchart illustrating a method of detecting text associated with video according to an embodiment aspect of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart illustrating a method of detecting text associated with video according to an embodiment of the present invention. The method of detecting the text of the video of FIG. 1 includes detecting or verifying a text area in a current frame (operations 10 through 16) and preparing to read a next frame depending on whether the current frame is an end frame of the video (operations 18 and 20).

In operation 10, a t-th (where t is a positive integer) frame, among frames forming video, is read as a current frame.

In operation 12, it is determined whether there is a text area detected from a previous frame which is a (t−N)-th (where N is a positive integer) frame among the frames forming the video, in the current frame. In this case, the text area is an area in which there is a text. The text in the text area may be a superimposed text, which is a text additionally inserted by video producer, or a scene text which is a text in the video itself. The text in the text area plays an important role in indexing, summarizing, or searching for the video.

Upon determining that there is no text area detected from the previous frame in the current frame, in operation 14, the text area is detected from the current frame. For example, when the current frame is a first frame, there is no previous frame. This case corresponds to a case where there is no text area detected from the previous frame in the current frame. Thus, the text area is detected from the current frame which is the first frame.

FIG. 2 is a flowchart illustrating operation 14 of FIG. 1 according to an embodiment 14A of the present invention. The embodiment 14A illustrated in FIG. 2 includes determining a text area from a current frame (operations 40 through 44) and searching for a starting frame (operation 46).

In operation 40, a character block is detected from the current frame.

FIG. 3 is a flowchart illustrating operation 40 of FIG. 2 according to an embodiment 40A of the present invention. The embodiment 40A illustrated in FIG. 3 includes determining a text candidate pixel and a text candidate block (operations 60 and 62) and determining a character block using the text candidate block (operation 64).

In operation 60, a brightness difference between a brightness of each pixel of a current frame and a brightness of each pixel of a next frame which is a (t+N)-th frame, the pixels in the same position, is obtained. A pixel of the current frame used in obtaining a brightness difference less than a first threshold value TH1 is determined as a text candidate pixel. In this case, when the current frame is a last frame of the video, there is no next frame. Thus, a brightness of each pixel of the next frame used in obtaining the brightness difference is set as a brightness of each pixel of the current frame, for example.

For example, in order to determine whether a pixel in a position (x, y) among pixels in the current frame is a text candidate pixel, a brightness difference (or an absolute value of the difference) between a brightness value $I_t(x, y)$ of the pixel and a brightness value $I_{t+N}(x, y)$ of a pixel in the same position (x, y) of the next frame is obtained Whether the brightness difference is less than the first threshold value TH1, is checked according to Equation 1.

$$|I_t(x,y)-I_{t+N}(x,y)|<TH1 \qquad (1)$$

In this case, upon determining that the brightness difference is less than the first threshold value TH1, the pixel in the position (x, y) of the current frame is set as the text candidate pixel.

FIG. 4 is a view showing group of pictures (GOPs) for understanding operation 60 of FIG. 3.

One GOP illustrated in FIG. 4 has three coded pictures joined together. For example, a GOP is repeatedly arranged in the order of I-B-B-P-B-B-P-B-B-P-B-B-P-B-B-P-B-B-I. Here, an intra-coded picture (hereinafter, referred to as an I-picture) to which a maximum number of bits is allocated is an intra-frame which affects the quality of the GOP and the coding performance of a predictive-coded picture (hereinafter, referred to as a P-picture) to which a number of bits next to the I-picture is allocated and which can be coded independently. In this case, the P-picture is a predictive frame which affects a subsequent P-picture and a bidirectionally predictive-coded picture (hereinafter, referred to as a B-picture) to which a minimum number of bits is allocated and which is coded using movement compensation from a previous intra-frame or predictive frame. The B-picture is a bidirectional predictive frame, which is coded using movement compensation of a previous or post intra-frame or predictive frame.

If N=18, as shown in FIG. 4, brightness values of corresponding pixels included in a next frame 70 corresponding to a (t+18)-th I-picture 66 are subtracted from brightness values of pixels included in a current frame 72 corresponding to a t-th I-picture 68, as given by Equation 1. The subtracted results are compared with a first threshold value TH1, and it is determined whether the pixels included in the current frame 72 are text candidate pixels.

In operation 62, the current frame 72 is divided into sub-blocks having a predetermined size. The number of text candidate pixels included in each of the sub-blocks is obtained, and a sub-block having the number of a text candidate pixel greater than a second threshold value TH2 is determined as a text candidate block. For example, when the current frame is divided into A×B sub-blocks, to determine whether a sub-block S(a, b) placed in an order (a, b)(where 1≦a≦A, 1≦b≦B) is the text candidate block. The number of text candidate pixels included in the sub-block S(a, b) is obtained, and it is checked whether the number of the text candidate pixels is greater than the second threshold value TH2 according to Equation 2.

$$\sum_{(x,y) \in S(a,b)} 1 > TH2 \quad (2)$$

Here, $\Sigma$ 1 is a total number of text candidate pixels expressed as a value of 1 among (x, y)∈S(a, b)

pixels placed in positions (x, y) included in the sub-block S(a, b).

Upon determining that the number of the text candidate pixels included in the sub-block S(a, b) is greater than the second threshold value TH2, the sub-block S(a, b) is determined as the text candidate block.

Figure 5:
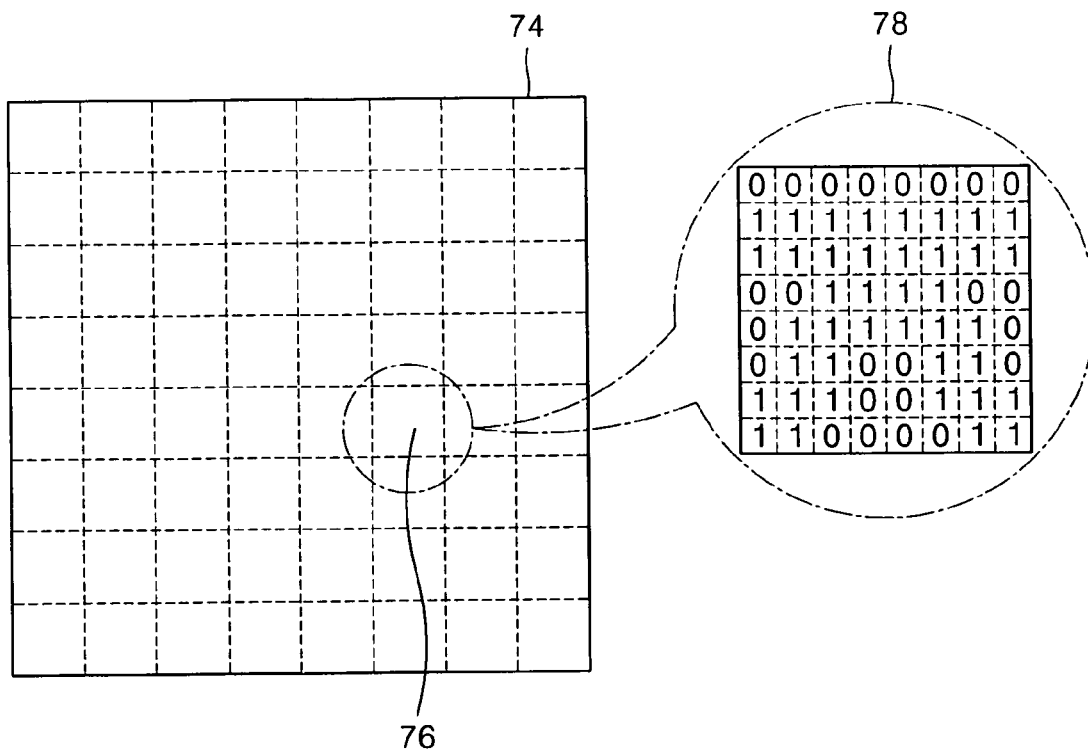
FIG. 5 is a view illustrating 8×8 sub-blocks to assist in an explanation of operation 62 of FIG. 3.

FIG. 5 is a view showing 8×8 sub-blocks to assist in understanding operation 62 of FIG. 3.

If A=B=8, as shown in FIG. 5, a current frame 74 is divided into 8×8 sub-blocks. In this case, as described above, the number of text candidate pixels included in a sub-block S(a, b) 76 is counted. The number of the text candidate pixels expressed as "1" in the current frame 74 of FIG. 5 is "40". For example, if the number of the text candidate pixels expressed as "1" among 8×8 pixels 78 included in the sub-block 76 is greater than the second threshold value TH2, the sub-block 76 is determined as a text candidate block.

In operation 64, an edge density of each text candidate block is obtained, a text candidate block having an edge density greater than a third threshold value TH3 is determined as a character block, and operation 42 is performed.

According to an embodiment of the present invention, as given by Equation 3, an edge density $d_{edge}$ is obtained by dividing summed results of edge gradient (G)s of pixels included in a text candidate block by the number of pixels included in the text candidate block.

$$d_{edge} = \frac{\sum_{(x,y) \in S'(a,b)} G}{P} \quad (3)$$

Here, $$\sum_{(x,y) \in S'(a,b)} G$$

is a total sum of edge gradients of pixel(x, y)s included in a text candidate block S'(a, b), and P is the number of pixels included in the text candidate block S'(a, b).

According to another embodiment of the present invention, as given by Equation 4, the edge density dedge is obtained by dividing a sum of results obtained by multiplying edge gradients of pixels included in a text candidate block by corresponding weighted value(W)s, by the number P of pixels included in the text candidate block.

$$d_{edge} = \frac{\sum_{(x,y) \in S'(a,b)} W \cdot G}{P} \quad (4)$$

Figure 6:
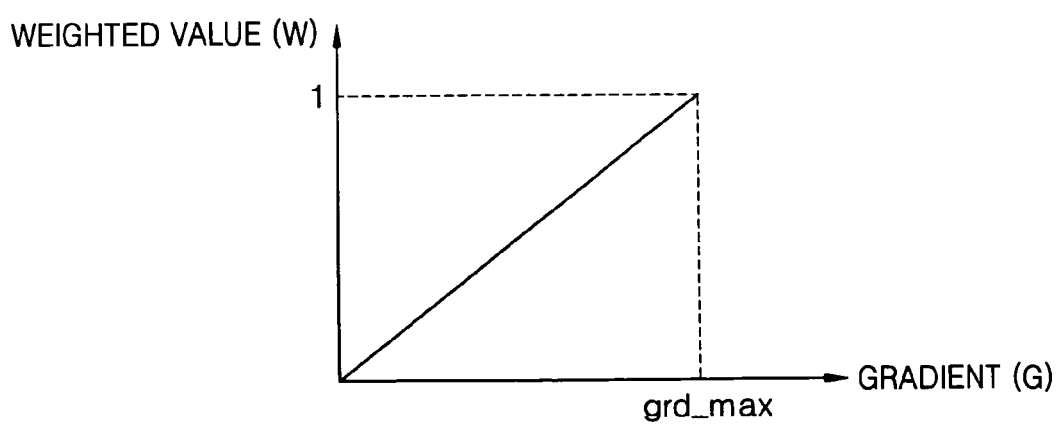
FIG. 6 is a graph illustrating weighted value versus gradient.

FIG. 6 is a graph illustrating weighted value W versus gradient G. A latitudinal axis is a gradient G, and a longitudinal axis is a weighted value W.

As shown in FIG. 6, the weighted value W of Equation 4 is obtained by dividing the gradient G by a maximum value grd_max of a gradient that may occur in the text candidate block.

In operation 42, it is determined whether the current frame is a text frame using the detected character block. To determine whether the current frame is the text frame, it is determined whether the number of character blocks included in the current frame is greater than a fourth threshold value TH4. If it is determined that the number of the character blocks included in the current frame is greater than the fourth threshold value TH4, the current frame is determined as the text frame.

If it is determined that the current frame is not the text frame, operation 18 is performed. However, upon determining that the current frame is the text frame, in operation 44, the text frame is post-processed, and a text area is determined from the text frame.

Figure 7:
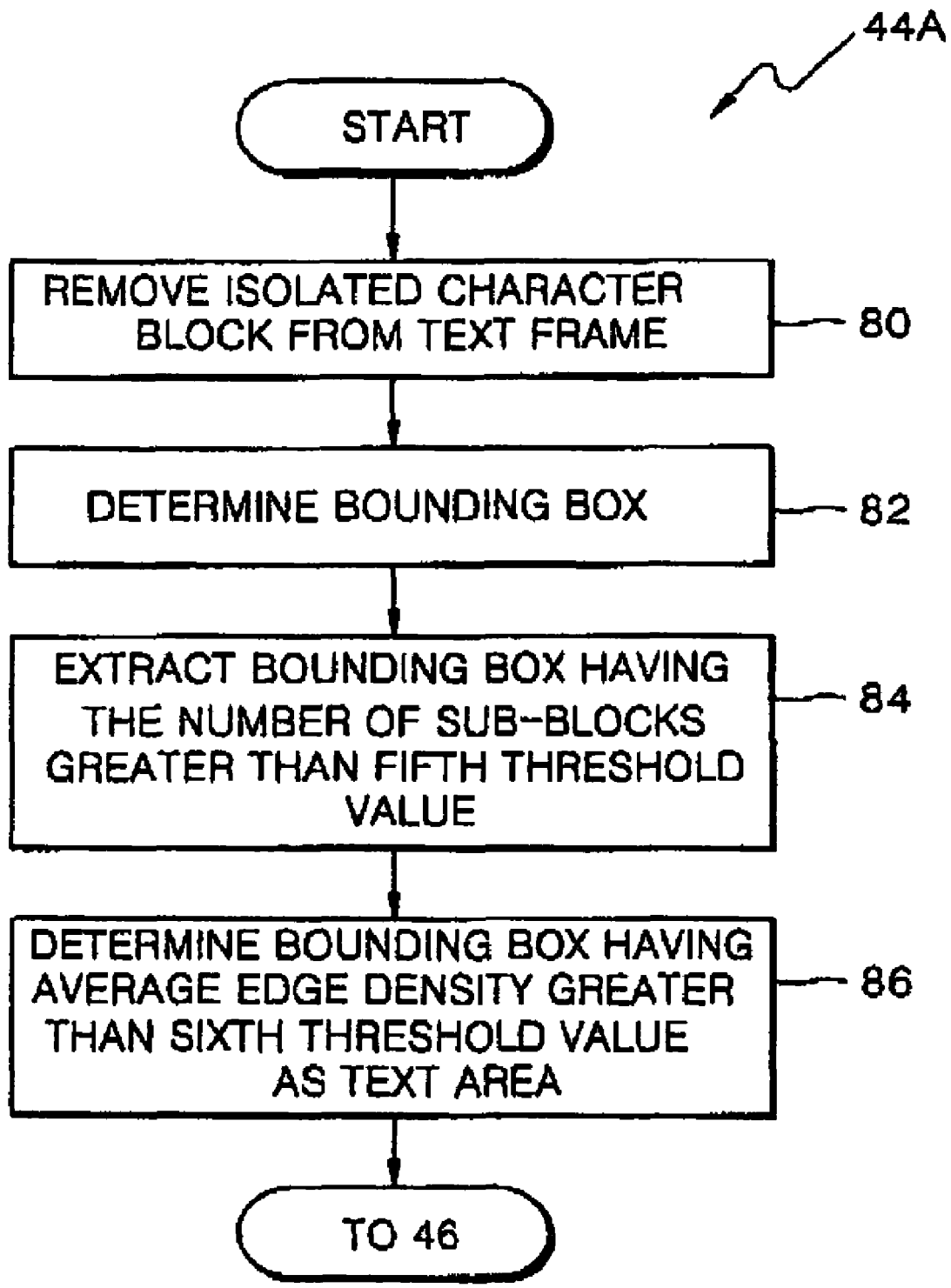
FIG. 7 is a flowchart illustrating operation 44 of FIG. 2 according to an embodiment of the present invention.

FIG. 7 is a flowchart illustrating operation 44 of FIG. 2 according to an embodiment 44A of the present invention. The embodiment 44A illustrated in FIG. 7 includes removing an isolated character block from a text frame (operation 80) and determining an optimum bounding box as a text area (operations 82 through 86).

Upon determining that the current frame is the text frame, in operation 80, the isolated character block in which there is no adjacent character block, is removed from a character block included in the text frame. Here, the isolated character block may occur due to noise, large text, or by a gap between texts.

In operation 82, a group of adjacent character blocks in the text frame from which the isolated character block is removed, is determined as the bounding box.

Figure 8:
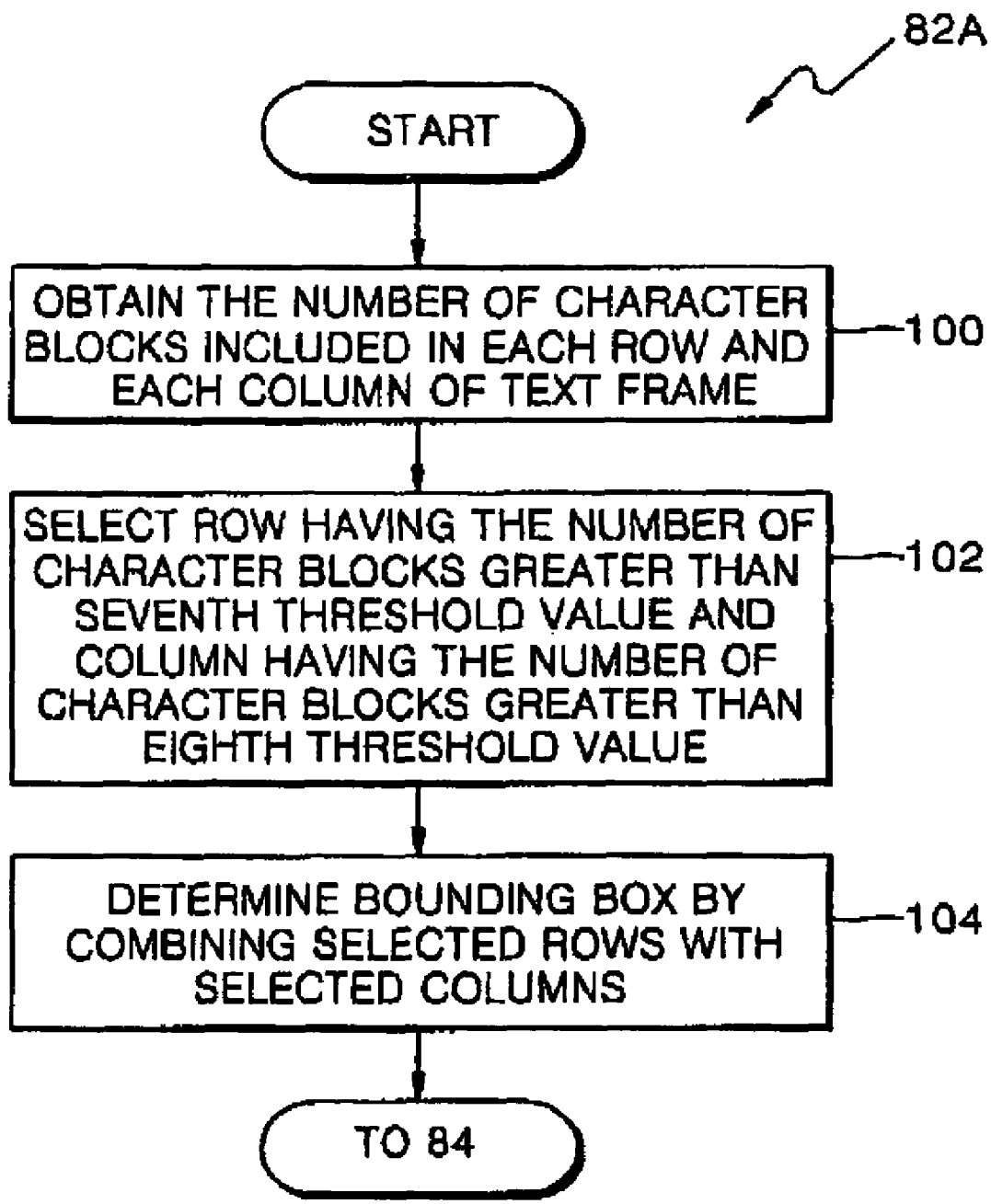
FIG. 8 is a flowchart illustrating operation 82 of FIG. 7 according to an embodiment of the present invention.

FIG. 8 is a flowchart illustrating operation 82 of FIG. 7 according to an embodiment 82A of the present invention. The embodiment 82A illustrated in FIG. 8 includes determining a bounding box using the number of character blocks obtained in each row and each column of a text frame (operations 100 through 104).

Figure 9:
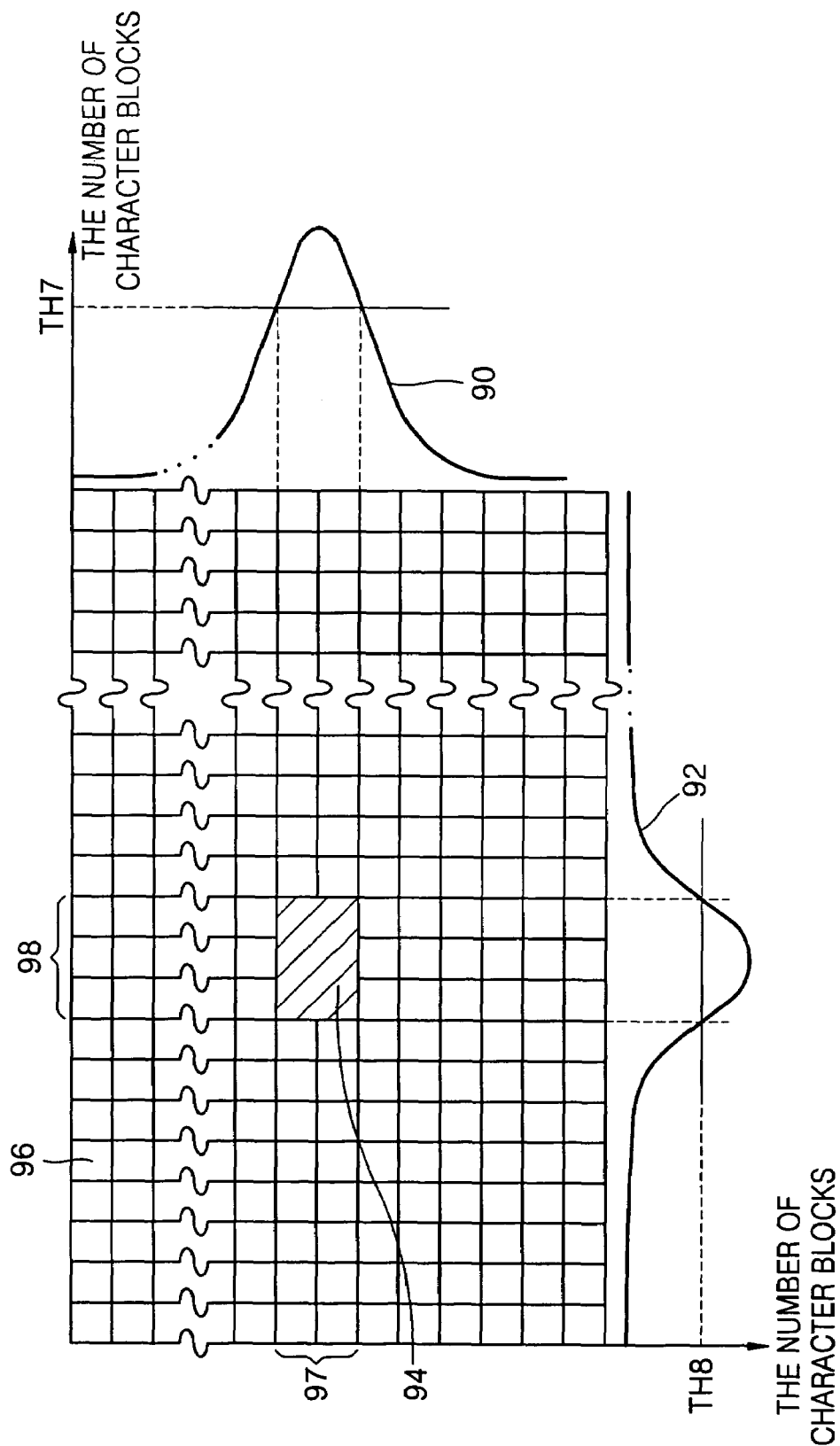
FIG. 9 is an example view of a text frame comprised of rows and columns, to assist in understanding operation 82A of FIG. 8.

FIG. 9 is an example view of a text frame comprised of rows and columns, to assist in understanding operation 82A of FIG. 8. Here, each row has a plurality of sub-blocks, and each column has a plurality of sub-blocks.

In operation 100, the number of character blocks included in each row and each column of the text frame from which an isolated character block is removed, is obtained. For example, as shown in FIG. 9, the number of character blocks included in each row of a text frame 96 is counted, and the number of character blocks included in each column of the text frame 96 is counted. For example, the counted results of the number of the character blocks included in each row is indicated by the form of a graph 90 of FIG. 9, and the counted results of the number of the character blocks included in each column may be indicated by the form of a graph 92 of FIG. 9.

In operation 102, a row having the number of character blocks greater than a seventh threshold value TH7 is selected from rows included in the current frame 96, and a column having the number of character blocks greater than an eighth threshold value TH8 is selected from columns included in the current frame 96. For example, when the numbers of character blocks included in each row and each column are as shown in FIG. 9, rows 97, having the number of character blocks greater than the seventh threshold value TH7, are selected from the rows included in the current frame 96 Columns 98 having the number of character blocks greater than the eighth threshold value TH8 are selected from the columns included in the current frame 96. In this case, the seventh threshold value TH7 may be the same as the eighth threshold value TH8.

In operation 104, the bounding box is determined by combining the selected rows with the selected columns, and operation 84 is performed.

Figure 10:
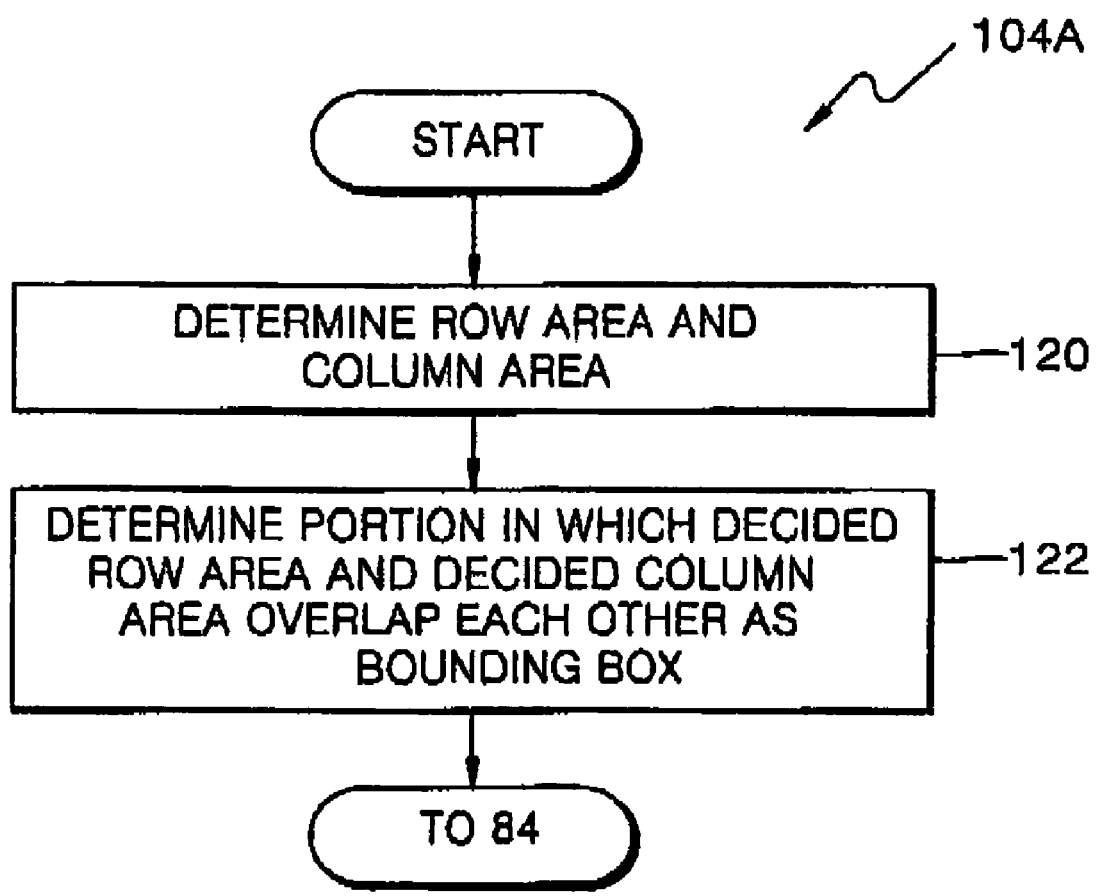
FIG. 10 is a flowchart illustrating operation 104 of FIG. 8 according to an embodiment of the present invention.

FIG. 10 is a flowchart illustrating operation 104 illustrated in FIG. 8 according to an embodiment 104A of the present invention. The embodiment 104A of FIG. 10 includes determining a row area and a column area and determining a bounding box using the determined areas (operations 120 and 122).

In operation 120, a portion in which character blocks are placed continuously in the row selected in operation 102 is determined as the row area, and a portion in which character blocks are placed continuously in the column selected in operation 102 is determined as the column area.

In operation 122, a portion in which the determined row area and the determined column area overlap each other is determined as the bounding box, and operation 84 is performed. For example, as shown in FIG. 9, a portion 94 in which the determined row area and the determined column area overlap each other may be determined as the bounding box.

In operation 84, when the current frame is divided into sub-blocks having a predetermined size, the number of sub-blocks included in each bounding box is obtained. Only a bounding box having the number of sub-blocks greater than a fifth threshold value TH5 is extracted from bounding boxes included in the text frame. For example, excluding a bounding box having a small size, only a bounding box having a large size is extracted. In this case, in order to extract a bounding box having the number of sub-blocks grater than the fifth threshold value TH5 from the text frame, a connected component labeling method is used. (See, for example, R. Jain, R. Kasturi, and B. G. Schunck "Machine Vision", McGraw-Hill Publisher, pp. 44-47, 1995 discussing a component labeling method.

In operation 86, an average edge density with respect to each of extracted bounding boxes is obtained, and an optimum bounding box having an average edge density greater than a sixth threshold value TH6 is determined as a text area.

According to an embodiment of the present invention, the average edge density is an average of edge densities of sub-blocks included in the extracted bounding boxes. In this case, since an edge density of a text candidate block among sub-blocks included in the extracted bounding boxes is obtained in operation 64 of FIG. 3, only the edge density of a nontext candidate block is obtained.

According to another embodiment of the present invention, the average edge density is an average of edge densities of text candidate blocks included in the extracted bounding boxes.

Here, the edge densities of the text candidate blocks included in the extracted bounding boxes have been already obtained in operation 64, and thus need not be obtained separately.

According to still another aspect of the present invention, the average edge density is an average of edge densities of the character blocks included in the extracted bounding boxes. Here, since the character blocks included in the extracted bounding boxes are text candidate blocks, edge densities thereof have been already obtained in operation 64, and thus need not be obtained separately.

In operation 46, a starting frame in which text associated with video starts to be displayed, is searched for on frames from a current frame Ft to a frame Ft−N+1 prior to a previous frame Ft−N.

Figure 11:
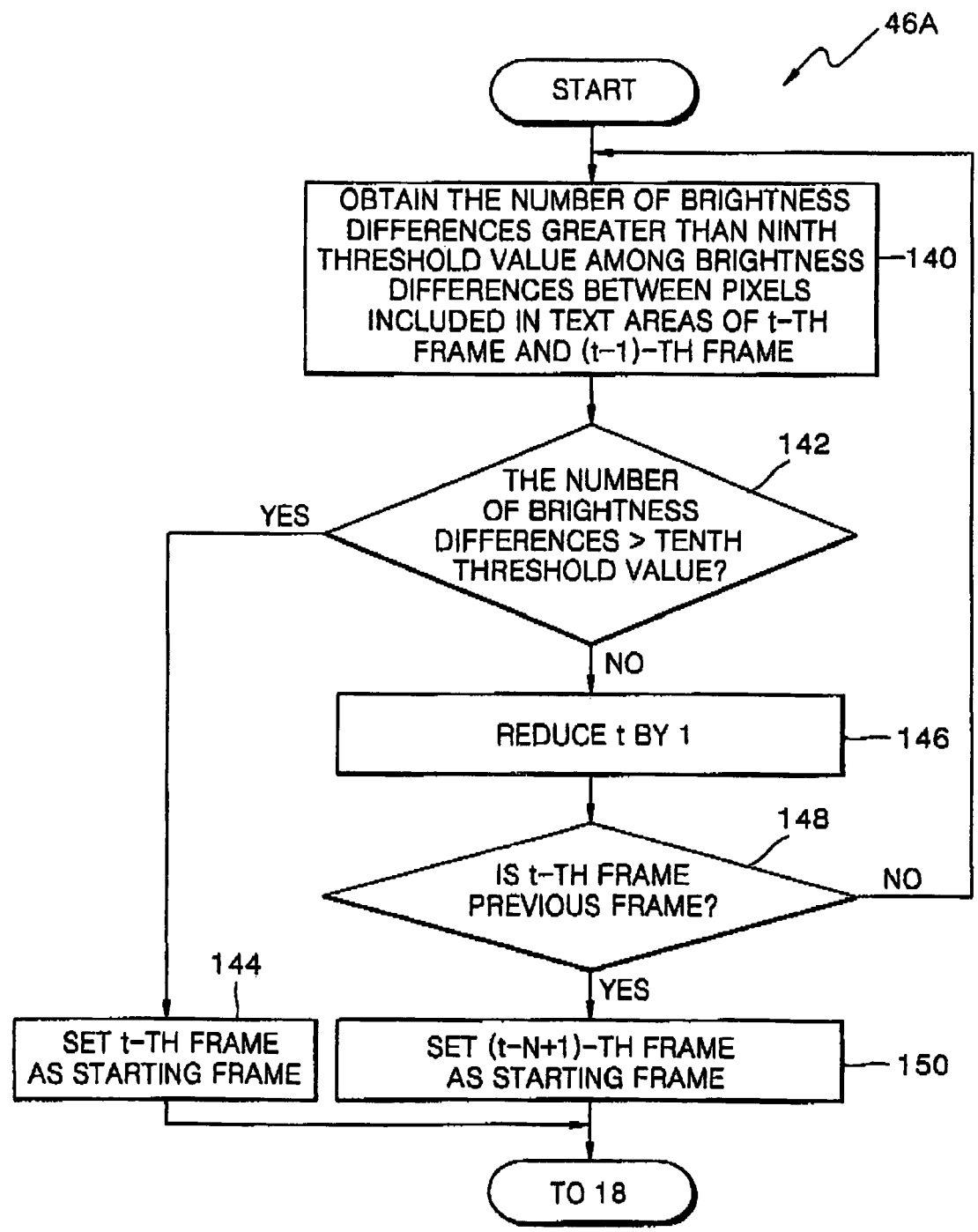
FIG. 11 is a flowchart illustrating operation 46 of FIG. 2 according to an embodiment of the present invention.

FIG. 11 is a flowchart illustrating operation 46 of FIG. 2 according to an embodiment 46A of the present invention. The embodiment 46A of FIG. 11 includes determining a starting frame using a brightness difference between frames (operations 140 through 150).

Figure 12:
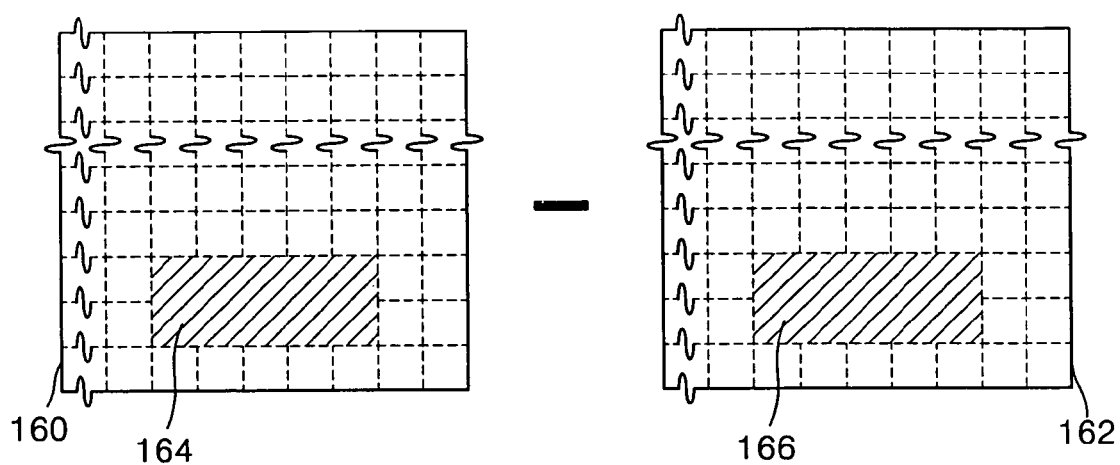
FIG. 12 is an example view of frames to assist in understanding the embodiment 46A of FIG. 11.

FIG. 12 is an example view of frames to assist in understanding the embodiment 46A of FIG. 11. The frames of FIG. 12 include a t-th frame Ft 160 having an oblique text area 164 and a (t−1)-th frame Ft−1 162 having an oblique text area 166.

In operation 140, the number NB1 of brightness differences greater than a ninth threshold value TH9 that are differences (or an absolute value of the differences) between brightness values Rt(x, y) of pixels in the text area 164 determined in the t-th frame Ft 160 and brightness values Rt−1 (x, y) of pixels in the text area 166 of the (t−1)-th frame Ft−1 162 corresponding to the text area 164, is obtained according to Equation 5.

$$NB1 = \Sigma[|R_t(x,y) - R_{t-1}(x,y)| > TH9] \tag{5}$$

In operation 142, it is determined whether the number NB1 of the brightness differences greater than the ninth threshold value TH9 is greater than a tenth threshold value TH10.

If it is determined that the number NB1 of the brightness differences greater than the ninth threshold value TH9 is greater than the tenth threshold value TH10, in operation 144, the t-th frame Ft is set as a starting frame in which a text starts to be displayed, and operation 18 is performed. However, if it is determined that the number NB1 of the brightness differences greater than the ninth threshold value TH9 is not greater than the tenth threshold value TH10, in operation 146, t is reduced by 1.

In operation 148, it is determined whether the t-th frame Ft is a previous frame. If it is determined that the t-th frame Ft is not the previous frame, operation 140 is performed, and the number NB1 of the brightness differences is obtained.

However, upon determining that the t-th frame Ft is the previous frame, in operation 150, a (t−N+1)-th frame is set as the starting frame in which the text starts to be displayed, and operation 18 is performed.

The embodiment 14A of FIG. 2 may alternatively not include operation 46. In this case, after operation 44, operation 18 is performed.

Meanwhile, if it is determined in operation 12 of FIG. 1 that there is the text area detected from the previous frame in the current frame, in operation 16, the text area is detected from an area (hereinafter referred to as the remaining area) obtained by excluding an area corresponding to the text area detected from the previous frame, from the current frame, and it is verified whether there is a text area in a next frame which is a (t+N)-th frame among frames forming video.

Figure 13:
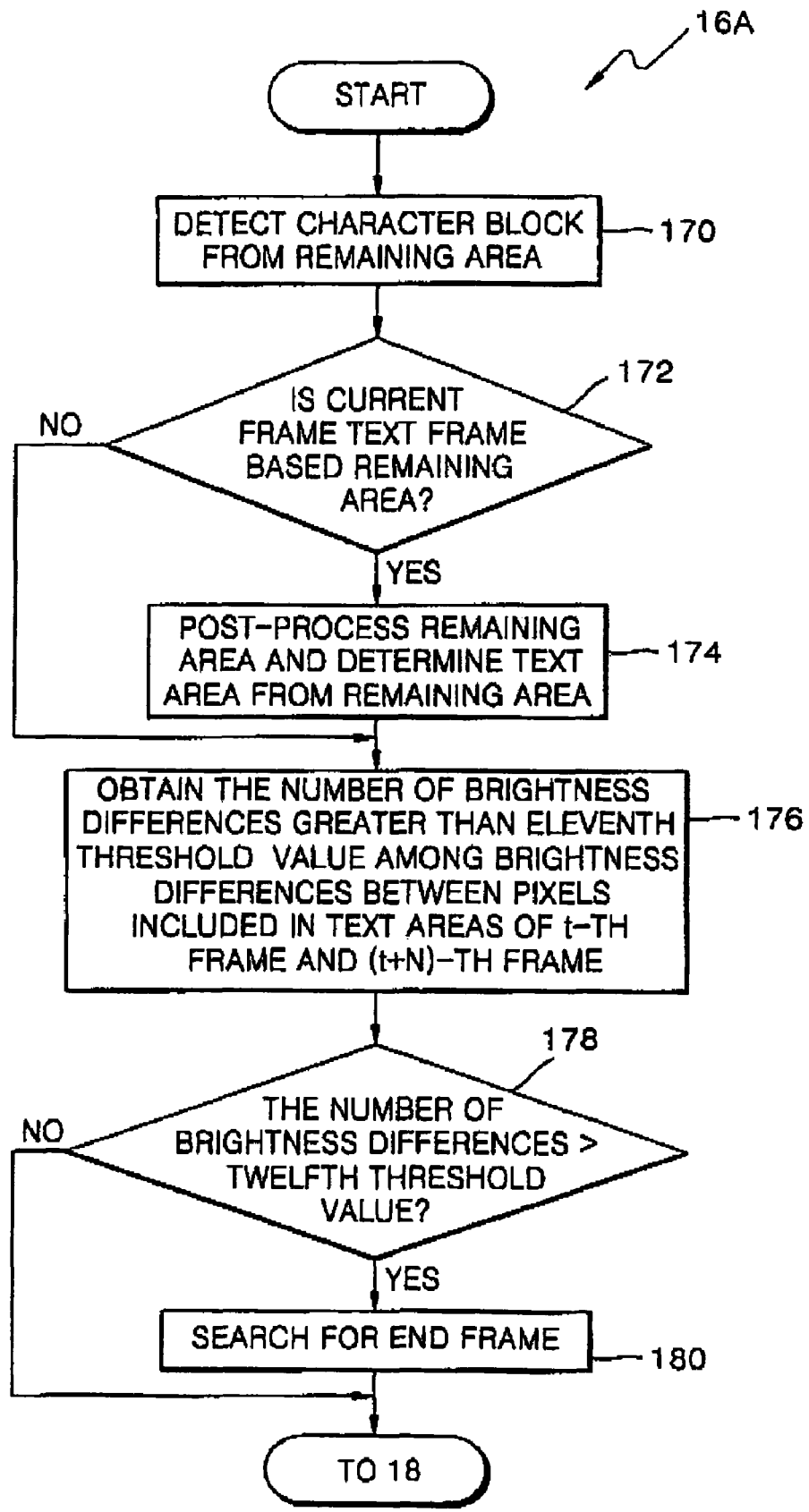
FIG. 13 is a flowchart illustrating operation 16 of FIG. 1 according to an embodiment of the present invention.

FIG. 13 is a flowchart illustrating operation 16 of FIG. 1 according to an 16A of the present invention. The embodiment 16A of FIG. 13 includes determining a text area from the remaining area (operations 170 through 174) and verifying whether there is a text area in a next frame and searching for an end frame (operations 176 through 180).

In operations 170 through 174, the text area is detected from the remaining area of the current frame as below.

If it is determined that there is the text area detected from the previous frame in the current frame, in operation 170, a character block is detected from the remaining area of the current frame. After operation 170, in operation 172, it is determined whether the current frame is a text frame based on the remaining area of the current frame. After operation 172, if it is determined that the current frame is the text frame, in operation 174, the remaining area is post-processed, and the text area is determined from the remaining area.

Operations 40, 42, and 44 of FIG. 2 are performed on the entire area of the current frame, and operations 170,172, and 174 of FIG. 13 are performed only on the remaining area of the current frame. Except for this point, operations 170, 172, and 174 correspond to operations 40, 42, and 44, respectively. Thus, by substituting the entire area of the current frame for the remaining area of the current frame in the description according to the embodiments of FIGS. 3, 7, 8, and 10, the embodiments illustrated in FIGS. 3, 7, 8, and 10 may be applied to operations 170, 172, and 174.

In general, since a superimposed text in video is shown for more than 2 seconds, there is often a text area of the previous frame in the current frame. Thus, by using the text area detected from the previous frame, a test area is obtained only from the remaining area of the current frame.

In operations 176 through 180, it is verified whether there is a text area in the next frame, and an end frame is searched for.

Figure 14:
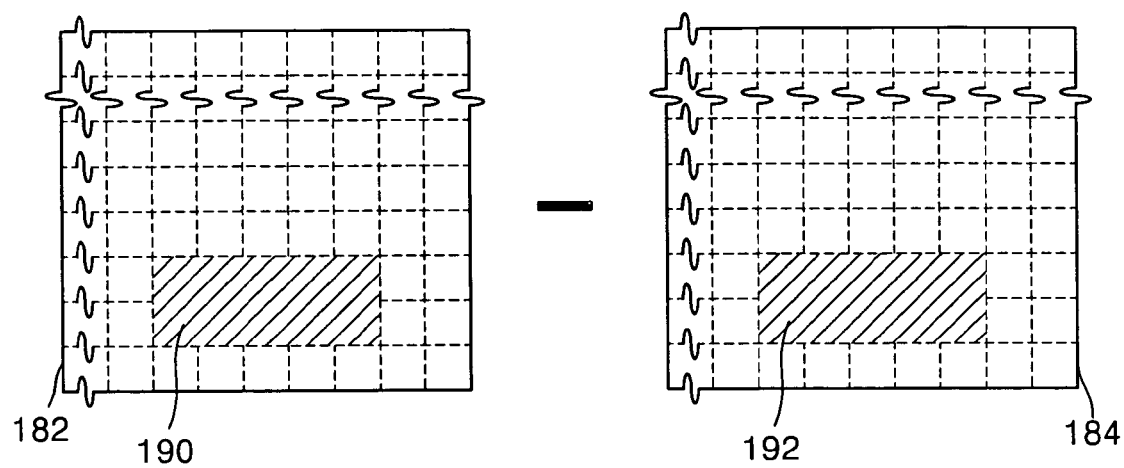
FIG. 14 is an example view of frames for understanding operation 176 of FIG. 13.

FIG. 14 is an example view of frames to assist in understanding operation 176 of FIG. 13. The frames of FIG. 14 include a (t+N)-th frame Ft+N 182 having an oblique text area 190 and a t-th frame Ft 184 having an oblique text area 192.

In operation 176, the number NB2 of brightness differences greater than an eleventh threshold value TH11 among brightness differences which are differences between brightness values Rt(x, y) of pixels in the text area 192 determined in the t-th frame Ft 184 and brightness values Rt+N(x, y) of pixels in the text area 190 of the (t+N)-th frame Ft+N 182, is obtained according to Equation 6. Here, the text area 190 of the (t+N)-th frame Ft+N 182 corresponds to the text area 192 determined in the t-th frame Ft 184 and is placed in the same position as the text area 192.

$$NB2=\Sigma[I\,R_t(x,y)-R_{t+N}(x,y)I>TH11] \qquad (6)$$

In operation 178, it is determined whether the number NB2 of the brightness differences greater than the eleventh threshold value TH11 is greater than a twelfth threshold value TH12. If there is no text area in the next frame Ft+N, the number NB2 of the brightness differences greater than the eleventh threshold value TH11 is greater than the twelfth threshold value TH12.

If it is determined that the number NB2 of the brightness differences greater than the eleventh threshold value TH11 is not greater than the twelfth threshold value TH12, that is, if it is determined that there is the text area in the next frame, operation 18 is performed. However, if it is determined that the number NB2 of the brightness differences greater than the eleventh threshold value TH11 is greater than the twelfth threshold value TH12, that is, if it is determined that there is no text area in the next frame, in operation 180, an end frame in which text associated with video ends is searched for.

Figure 15:
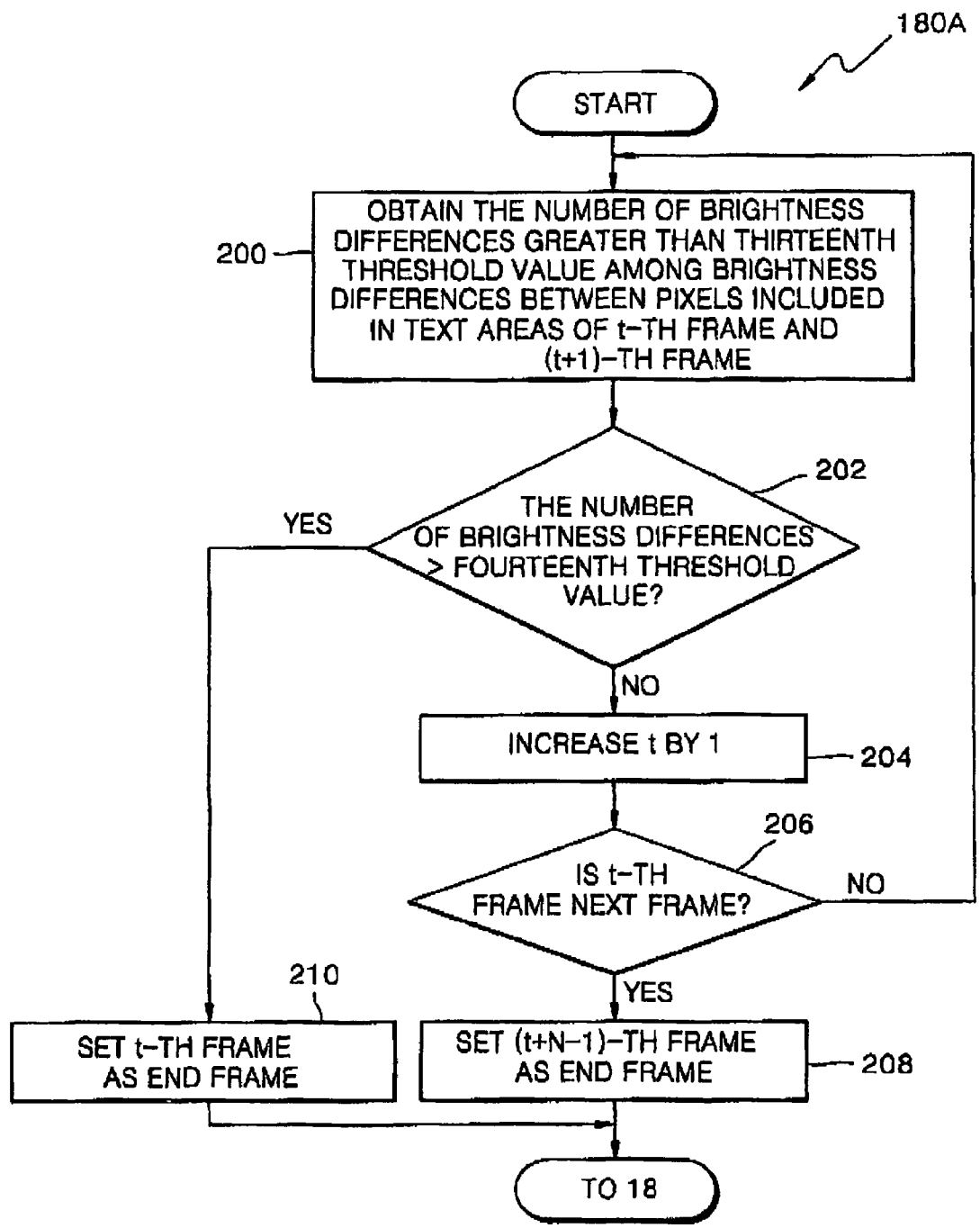
FIG. 15 is a flowchart illustrating operation 180 of FIG. 13 according to an embodiment of the present invention.

FIG. 15 is a flowchart illustrating operation 180 of FIG. 13 according to an embodiment 180A of the present invention.

The embodiment 180A of FIG. 15 includes determining an end frame using a brightness difference between frames (operations 200 through 210).

Figure 16:
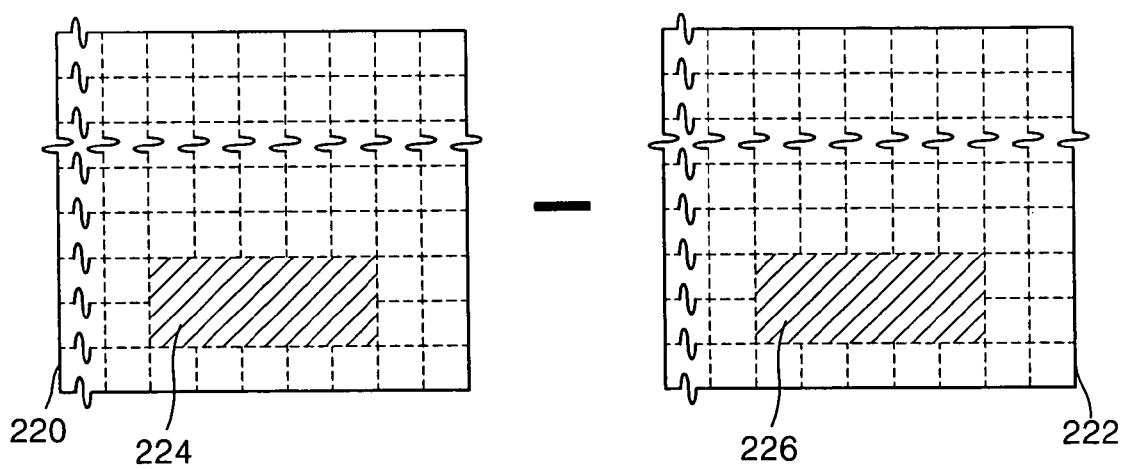
FIG. 16 is an example view of frames for understanding operation 180A of FIG. 15.

FIG. 16 is an example view of frames to assist in an understanding of operation 180A of FIG. 15. The frames of FIG. 16 include a (t+1)-th frame Ft+1 220 having an oblique text area 224 and a t-th frame Ft 222 having an oblique text area 226.

If it is determined in operation 178 of FIG. 13 that the number NB2 of brightness differences is greater than the twelfth threshold value TH12, that is, if it is determined that there is no text area in the next frame, in operation 200, the number NB3 of brightness differences greater than a thirteenth threshold value TH13 among brightness differences which are differences between brightness values Rt(x, y) of pixels in the text area 226 determined in the t-th frame Ft 222 and brightness values Rt+1 of pixels in the text area 224 of the (t+1)-th frame Ft+1 220, is obtained according to Equation 7. Here, the (t+1)-th frame Ft+1 220 is a frame which is later than the t-th frame Ft 222, the text area 224 of the (t+1)-th frame 220 corresponds to the text area 226 determined in the t-th frame Ft 222 and is placed in the same position as the text area 226.

$$NB3=\Sigma[I\,R_{t+1}(x,y)-R_t(x,y)I>TH13] \qquad (7)$$

In operation 202, it is determined whether the number NB3 of the brightness differences greater than the thirteenth threshold value TH13 is greater than a fourteenth threshold value TH14.

If it is determined that the number NB3 of the brightness differences greater than the thirteenth threshold value TH13 is greater than the fourteenth threshold value TH14, in operation 210, the t-th frame Ft 222 is determined as an end frame. However, if it is determined that the number NB3 of the brightness differences greater than the thirteenth threshold value TH13 is not greater than the fourteenth threshold value TH14, in operation 204, the value of t is increased by 1.

In operation 206, it is determined whether the t-th frame Ft 222 is a next frame. If it is determined that the t-th frame Ft 222 is not the next frame, operation 200 is performed, and the number NB3 of the brightness differences is obtained.

However, upon determining that the t-th frame Ft 222 is the next frame, in operation 208, (t+N−1)-th frame Ft+N−1 is determined as the end frame.

The embodiment 16A illustrated in FIG. 13 may alternatively not include operation 180. In this case, operation 18 is performed independent of whether the number NB2 of the brightness differences is greater than the twelfth threshold value TH12.

Meanwhile, after the text area is detected or verified, that is, after operation 14 or 16 shown in FIG. 1, in operation 18, it is determined whether the current frame is the end frame of the video. Upon determining that the current frame is the end frame of the video, the method of detecting the text of the video shown in FIG. 1 is terminated. However, if it is determined that the current frame is not the end frame of the video, in operation 20, the value of t is increased by a value N. The method proceeds with operation 10 in which the current frame is read. Thus, the above-described operations 10 through 18 are performed using the t-th frame increased by N, as the current frame.

Hereinafter, an apparatus for detecting text associated with video according to an aspect of the present invention will be described in detail with reference to the attached drawings.

Figure 17:
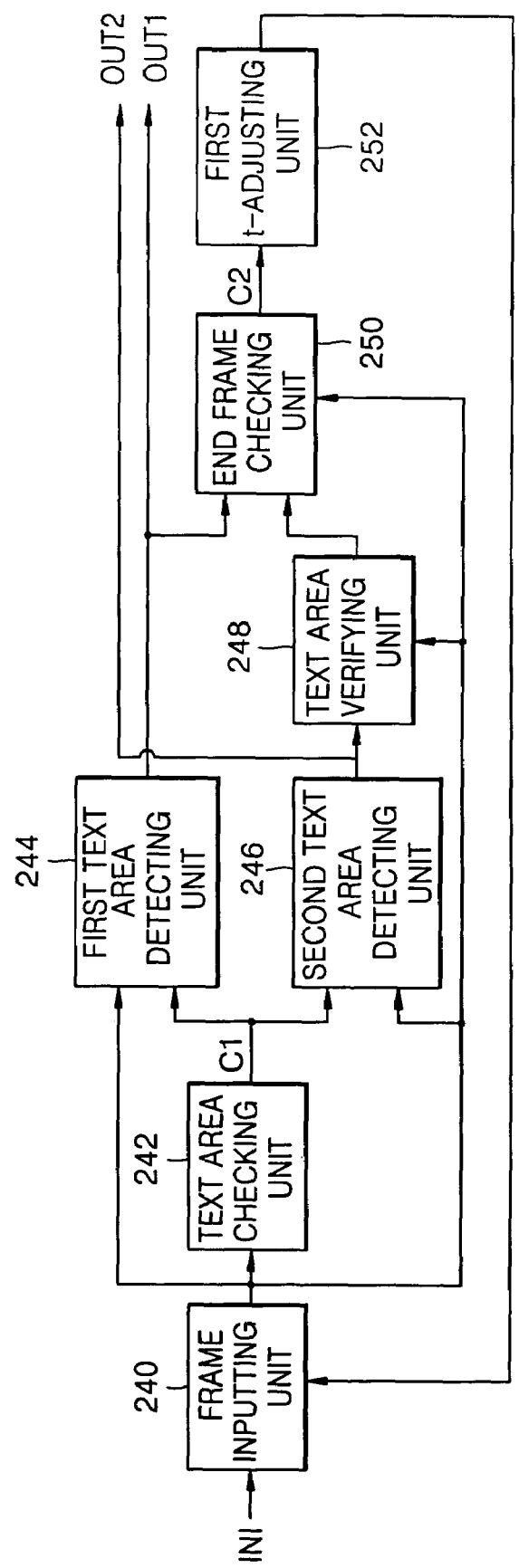
FIG. 17 is a block diagram of an apparatus for detecting text associated with video according to an embodiment of the present invention.

FIG. 17 is a block diagram of an apparatus for detecting text associated with video according to an embodiment of the present invention. The apparatus of FIG. 17 includes a frame inputting unit 240, a text area checking unit 242, first and second text area detecting units 244 and 246, a text area verifying unit 248, an end frame checking unit 250, and a first t-adjusting unit 252.

The apparatus of FIG. 17 performs the method of detecting the text of the video shown in FIG. 1.

To perform operation 10, the frame inputting unit 240 reads a current frame which is a t-th frame among frames forming video, through an input terminal IN1.

To perform operation 12, the text area checking unit 242 checks whether there is a text area detected from a previous frame in the current frame inputted by the frame inputting unit 240 and outputs the checked results to the first and second text area detecting units 244 and 246 as a first control signal C1.

To perform operation 14, the first text area detecting unit 244 detects the text area from the current frame inputted by the frame inputting unit 240 and outputs the detected results through an output terminal OUT1 in response to the first control signal C1 inputted by the text area checking unit 242. For example, upon recognizing from the first control signal C1 that there is no text area detected from the previous frame in the current frame, the first text area detecting unit 244 detects the text area from the current frame.

Figure 18:
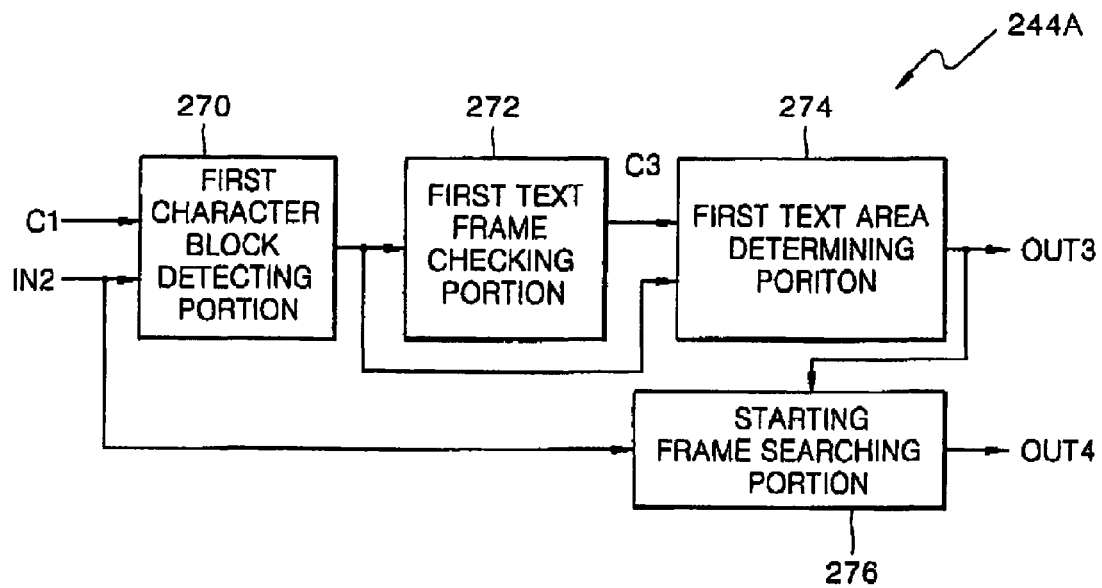
FIG. 18 is a block diagram of a first text area detecting unit of FIG. 17 according to an embodiment of the present invention.

FIG. 18 is a block diagram of the first text area detecting unit 244 of FIG. 17 according to an embodiment 244A of the present invention. The first text area detecting unit 244A of FIG. 18 includes a first character block detecting portion 270, a first text frame checking portion 272, a first text area determining portion 274, and a starting frame searching portion 276.

The first text area detecting unit 244A of FIG. 18 performs operation 14A of FIG. 2.

To perform operation 40, upon recognizing from the first control signal C1 inputted by the text area checking unit 242 that there is no text area detected from the previous frame in the current frame, the first character block detecting portion 270 detects a character block from the current frame inputted by the frame inputting unit 240 through an input terminal IN2.

Figure 19:
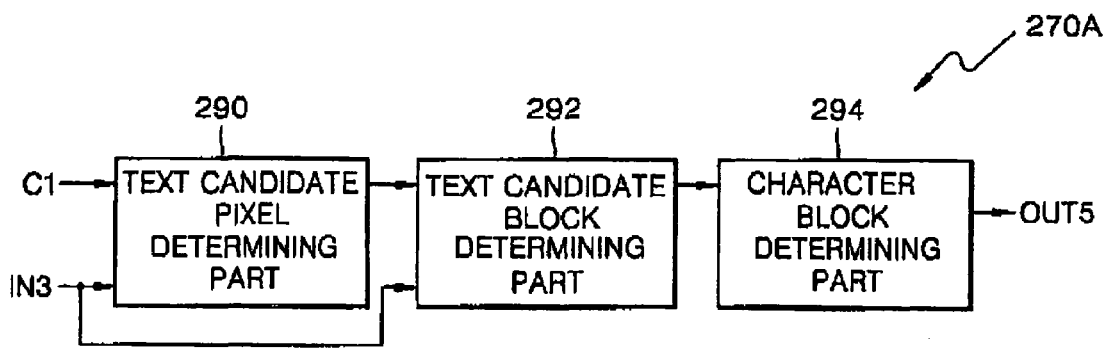
FIG. 19 is a block diagram of a first character block detecting portion of FIG. 18 according to an embodiment of the present invention.

FIG. 19 is a block diagram of the first character block detecting portion 270 of FIG. 18 according to an embodiment 270A of the present invention. The first character block detecting portion 270A of FIG. 19 includes a text candidate pixel determining part 290, a text candidate block deciding part 292, and a character block determining part 294.

The first character block detecting portion 270A of FIG. 19 performs operation 40A illustrated, for example, in FIG. 3.

The text candidate pixel determining part 290 performs operation 60. That is, upon recognizing from the first control signal C1 inputted by the text area checking unit 242 that there is no text area detected from the previous frame in the current frame, the text candidate pixel determining part 290 inputs the current frame and a next frame using the frame inputting unit 240 through an input terminal IN3. In this case, the text candidate pixel determining part 290 obtains a brightness difference between brightness of each pixel of the current frame and a brightness of each pixel of a next frame, the pixels being placed in the same position, and determines a pixel of the current frame used in obtaining a brightness difference less than a first threshold value TH1 as a text candidate pixel.

To perform operation 62, the text candidate block determining part 292 divides the current frame inputted by the frame inputting unit 240 through the input terminal IN3 into sub-blocks having a predetermined size, obtains the number of text candidate pixels included in each of the sub-blocks, and determines a sub-block having the number of a text candidate pixel greater than a second threshold value TH2 as a text candidate block.

To perform operation 64, the character block determining part 294 obtains an edge density of each text candidate block determined by the text candidate block determining part 292, determining a text candidate block having an edgy density greater than a third threshold value TH3 as a character block, and outputs the determined character block through an output terminal OUT5.

To perform operation 42, the first text frame checking portion 272 checks whether the current frame is a text frame using the character block detected by the first character block detecting portion 270 and outputs the checked results to the first text area determining portion 274 as a third control signal C3.

Figure 20:
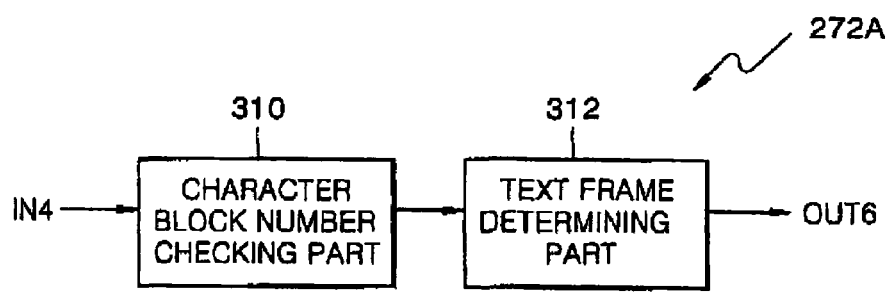
FIG. 20 is a block diagram of a first text frame checking portion of FIG. 18 according to an embodiment of the present invention.

FIG. 20 is a block diagram of the first text frame checking portion 272 of FIG. 18 according to an embodiment 272A of the present invention. The first text frame checking portion 272A of FIG. 20 includes a character block number checking part 310 and a text frame checking part 312.

The character block number checking part 310 inputs a character block included in a current frame from the first character block detecting portion 270 through an input terminal IN4, counts the number of the inputted character blocks, checks whether the number of the character blocks as counted results is greater than a fourth threshold value TH4, and outputs the checked results to the text frame determining part 312.

The text frame determining part 312 determines the current frame having the number of character blocks greater than the fourth threshold value TH4 as a text frame according to the checked results inputted by the character block number checking part 310 and outputs the determined results as a third control signal C3 through an output terminal OUT6.

To perform operation 44, upon recognizing from the third control signal C3 inputted by the first text frame checking portion 272 that the current frame is the text frame, the first text area determining portion 274 of FIG. 18 post-processes the text frame, determines a text area from the text frame, and outputs the determined text area through an output terminal OUT3.

Figure 21:
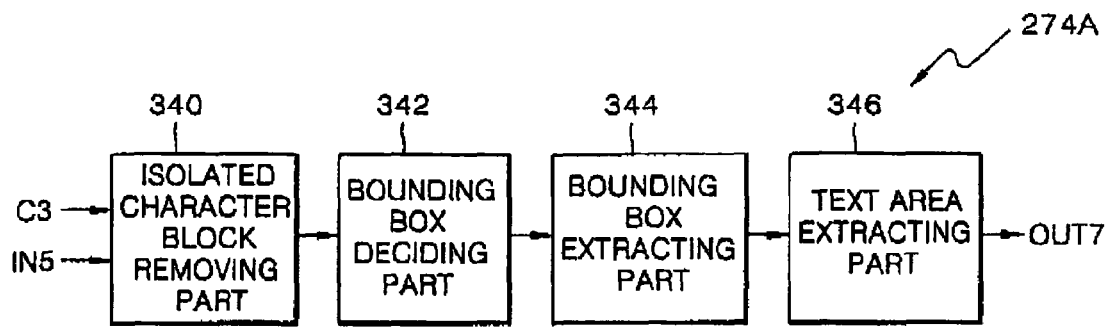
FIG. 21 is a block diagram of a first text area determining portion of FIG. 18 according to an embodiment of the present invention.

FIG. 21 is a block diagram of the first text area determining portion 274 of FIG. 18 according to an embodiment 274A of the present invention. The first text area determining portion 274A of FIG. 21 includes an isolated character block removing part 340, a bounding box determining part 342, a bounding box extracting part 344, and a text area extracting part 346.

The first text area determining portion 274A of FIG. 21 may perform operation 44A of FIG. 7.

To perform operation 80, upon recognizing from the third control signal C3 inputted by the first text frame checking portion 272 that the current frame is the text frame, the isolated character block removing part 340 removes an isolated character block in which there is no adjacent character block, from character blocks included in the text frame and inputted by the first character block detecting portion 270 through an input terminal IN5 and outputs the text frame from which the isolated character block is removed, to the bounding box determining part 342.

To perform operation 82, the bounding box determining part 342 determines a group of adjacent character blocks from the text frame from which the isolated character block is removed, as a bounding box and outputs the determined bounding box to the bounding box extracting part 344.

Figure 22:
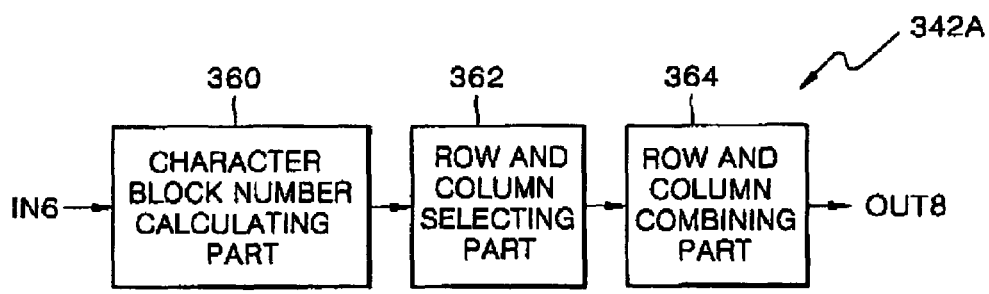
FIG. 22 is a block diagram of a bounding box determining part of FIG. 21 according to an embodiment of the present invention

FIG. 22 is a block diagram of the bounding box determining part 342 of FIG. 21 according to an embodiment 342A of the present invention. The bounding box determining part 342A includes a character block number calculating part 360, a row and column selecting part 362, and a row and column combining part 364.

The bounding box determining part 342A may perform operation 82A of FIG. 8.

To perform operation 100, the character block number calculating part 360 calculates the number of character blocks included in each row and each column of the text frame, in which the isolated character block is removed, inputted by the isolated character block removing part 340 through an input terminal IN6, and outputs the calculated number of the character blocks included in each row and each column of the text frame to the row and column selecting part 362.

To perform operation 102, the row and column selecting part 362 selects a row having the number of character blocks greater than a seventh threshold value TH7 from rows included in the text frame from which the isolated character block is removed, selects a column having the number of character blocks greater than an eighth threshold value TH8 from columns included in the text frame from which the isolated character block is removed, and outputs the selected row and column to the row and column combining part 364.

To perform operation 104, the row and column combining part 364 determines the bounding box by combining the selected rows with the selected columns and outputs the determined bounding box to the bounding box extracting part 344 through an output terminal OUT8.

Figure 23:
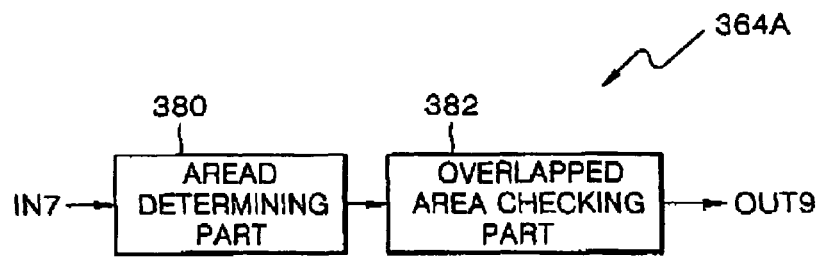
FIG. 23 is a block diagram of a row and column combining part of FIG. 22 according to an embodiment of the present invention

FIG. 23 is a block diagram of the row and column combining part 364 of FIG. 22 according to an embodiment 364A of the present invention. The row and column combining part 364A includes an area determining part 380 and an overlapped area checking part 382.

The row and column combining part 364A may perform operation 104A illustrated for example in FIG. 10. Here, the area determining part 380 may perform operation 120. That is, the area determining part 380 determines a portion in which character blocks are placed continuously in the selected row inputted by the row and column selecting part 362 through an input terminal IN7, as the row area and outputs the determined row area to the overlapped area checking part 382. In addition, the area determining part 380 d determines a portion in which character blocks are placed continuously in the selected column inputted by the row and column selecting part 362 through the input terminal IN7, as the column area and outputs the determined column area to the overlapped area checking part 382.

In order to perform operation 122, the overlapped area checking part 382 determines a portion in which the determined row area and the determined column area overlap each other as the bounding box, and outputs the determined bounding box to the bounding box extracting part 344 through an output terminal OUT9.

To perform operation 84, when the current frame is divided into sub-blocks having a predetermined size, the bounding box extracting part 344 of FIG. 21 obtains the number of sub-blocks included in the determined bounding box, extracts the bounding box having the number of sub-blocks greater than a fifth threshold value TH5 from the text frame and outputs the extracted bounding box to the text area extracting part 346.

To perform operation 86, the text area extracting part 346 obtains an average edge density with respect to each of bounding boxes extracted by the bounding box extracting part 344, determines a bounding box having an average edge density greater than a sixth threshold value TH6 as a text area, and outputs the determined text area through an output terminal OUT7.

The first text area detecting unit 244A of FIG. 18 may further include a starting frame searching portion 276. The starting frame searching portion 276 searches for a starting frame in which text associated with video starts to be displayed, among frames from a current frame to a frame prior to the previous frame and outputs the searched results through an output terminal OUT4 in response to a signal inputted by the first text area determining portion 274 that represents whether determining the text area is completed. For example, upon recognizing, from the first text area determining portion 274 that determining the text area is completed, the starting frame searching portion 276 searches for the starting frame.

Figure 24:
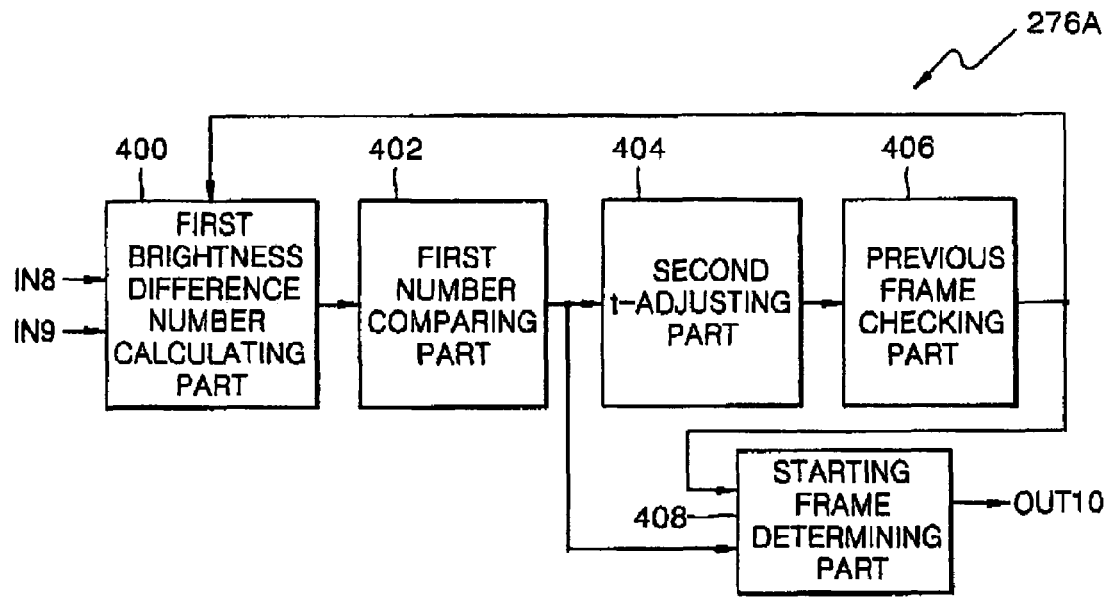
FIG. 24 is a block diagram of a starting frame searching portion of FIG. 18 according to an embodiment of the present invention.

FIG. 24 is a block diagram of the starting frame searching portion 276 of FIG. 18 according to an embodiment 276A of the present invention. The starting frame searching portion 276A includes a first brightness difference number calculating part 400, a first number comparing part 402, a second t-adjusting part 404, a previous frame checking part 406, and a starting frame determining part 408.

The starting frame searching portion 276A of FIG. 24 may perform operation 46A of FIG. 11.

The first brightness difference number calculating part 400 performs operation 140. That is, the first brightness difference number calculating part 400 inputs a t-th frame and a (t−1)-th frame from the frame inputting unit 240 through an input terminal IN9 in response to a signal inputted by the first text area determining portion 274 through an input terminal IN8 that represents whether determining the text area is completed. In this case, the first brightness difference number calculating part 400 calculates the number NB1 of brightness differences greater than a ninth threshold value TH9 among brightness differences which are differences between brightness values of pixels in the text area determined in the t-th frame and brightness values of pixels in the text area of the (t−1)-th frame corresponding to the text area determined in the t-th frame, according to Equation 5 and outputs the calculated results to the first number comparing part 402.

To perform operation 142, the first number comparing part 402 compares the number NB1 of the brightness differences greater than the ninth threshold value TH9 with a tenth threshold value TH10 and outputs the compared results to the second t-adjusting part 404.

To perform operation 146, the second t-adjusting part 404 reduces t by 1 and outputs the reduced t to the previous frame checking part 406 in response to the compared results using the first number comparing part 402. For example, if it is recognized from the compared results of the first number comparing part 402 that the number NB1 of the brightness differences is not greater than the tenth threshold value TH10, the second t-adjusting part 404 reduces t by 1.

To perform operation 148, the previous frame checking part 406 checks whether the t-th frame adjusted by the second t-adjusting part 404 is the previous frame and outputs the checked results to each of the starting frame determining part 408 and the first brightness number calculating part 400.

Upon recognizing from the checked results of the previous frame checking part 406 that the t-th frame is not the previous frame, the first brightness difference number calculating part 400 calculates the number NB1 of the brightness differences.

The starting frame determining part 408 performs operations 144 and 150.

To perform operation 144, upon recognizing from the compared results of the first number comparing part 402 that the number NB1 of the brightness differences is greater than the tenth threshold value TH10, the starting frame determining part 408 sets the t-th frame as the starting frame and outputs the determined results through an output terminal OUT10.

To perform operation 150, upon recognizing from the checked results of the previous frame checking part 406 that the t-th frame is the previous frame, the starting frame determining part 408 sets a (t−N+1)-th frame as a starting frame and outputs the determined results through an output terminal OUT10.

As described above, operation 14A of FIG. 2 may alternatively not include operation 46. Similarly, the first text area detecting unit 244A of FIG. 18 may alternatively not include the starting frame searching portion 276.

The second text area detecting unit 246 and the text area verifying unit 248 of FIG. 17 perform operation 16.

Upon recognizing from the first control signal C1 inputted by the text area checking unit 242 that there is the text area detected from the previous frame in the current frame, the second text area detecting unit 246 detects the text area from a remaining area obtained by excluding an area corresponding to the text area detected from the previous frame from the current frame inputted by the frame inputting unit 240 and outputs the detected text area through an output terminal OUT2.

Figure 25:
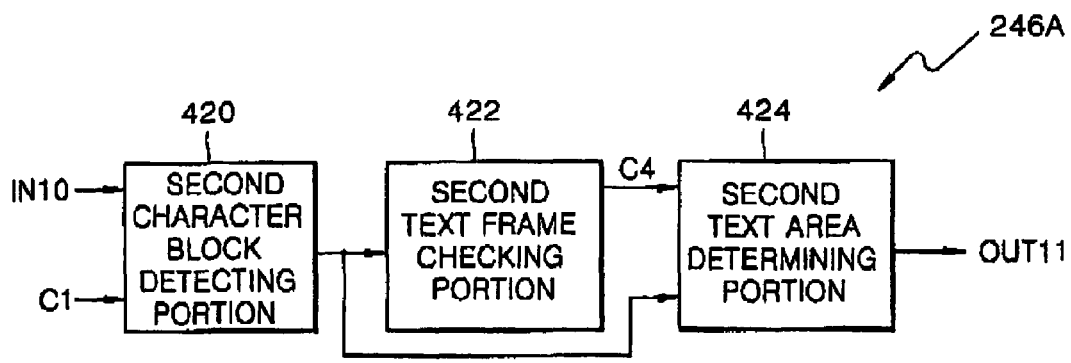
FIG. 25 is a block diagram of a second text area detecting unit of FIG. 17 according to an embodiment of the present invention

FIG. 25 is a block diagram of the second text area detecting unit 246 of FIG. 17 according to an embodiment 246A of the present invention. The second text area detecting unit 246A of FIG. 25 includes a second character block detecting portion 420, a second text frame checking portion 422, and a second text area determining portion 424.

The second text area detecting unit 246A of FIG. 25 may perform operations 170, 172, and 174 of FIG. 13.

To perform operation 170, upon recognizing from the first control signal C1 inputted by the text area checking unit 242 that there is the text area detected from the previous frame in the current frame, the second character block detecting portion 420 detects a character block from the remaining area of the current frame inputted by the frame inputting unit 240 through an input terminal IN10 and outputs the detected character block to the second text frame checking portion 422.

To perform operation 172, the second text frame checking portion 422 checks whether the current frame is the text frame using the character block extracted from the remaining area of the current frame and inputted by the second character block detecting portion 420 and outputs the checked results to the second text area determining portion 424 as a fourth control signal C4.

To perform operation 174, upon recognizing from the fourth control signal C4 that the current frame is the text frame based on the remaining area of the current frame, the second text area determining portion 424 post-processes the remaining area inputted by the second character block detecting portion 420, determines the text area from the remaining area, and outputs the determined text area through an output terminal OUT11.

The first character block detecting portion 270, the first text frame checking portion 272, and the first text area determining portion 274 of FIG. 18 perform respective operations on the entire area of the current frame. The second character block detecting portion 420, the second text frame checking portion 422, and the second text area determining unit 424 of FIG. 25 perform respective operations on the remaining area of the current frame. Except for this point, the second character block detecting portion 420, the second text frame checking portion 422, and the second text area determining unit 424 correspond to the first character block detecting portion 270, the first text frame checking portion 272, and the first text area determining portion 274, respectively. Thus, by substituting the entire area of the current frame for the remaining area of the current frame of FIGS. 19 through 23, the embodiments illustrated in FIGS. 19 through 23 may be applied to the second character block detecting portion 420, the second text frame checking portion 422, and the second text area determining unit 424.

When detecting the text area from the remaining area of the current is completed by the second text area detecting unit 246, the text area verifying unit 248 verifies whether there is the text area in a next frame, which is a (t+N)-th frame among frames forming video and which is inputted by the frame inputting unit 240, and outputs the verified results to the end frame checking unit 250.

Figure 26:
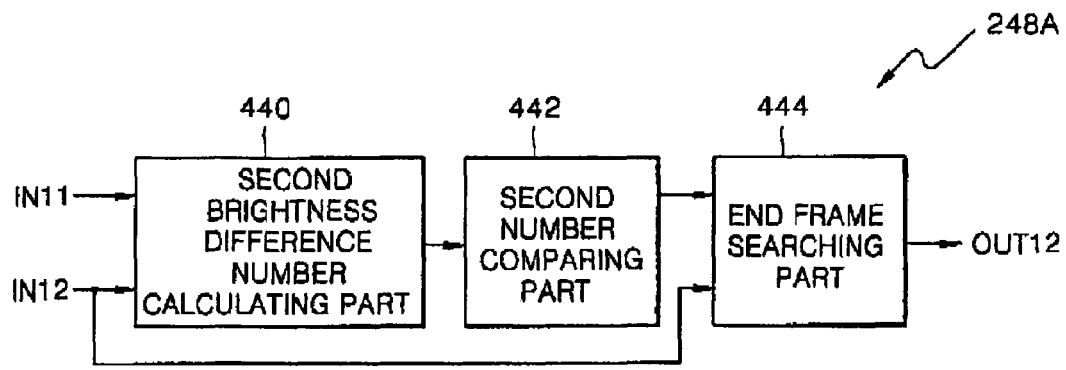
FIG. 26 is a block diagram of a text area verifying unit of FIG. 17 according to an embodiment of the present invention.

FIG. 26 is a block diagram of the text area verifying unit 248 of FIG. 17 according to an embodiment 248A of the present invention. The text area verifying unit 248A of FIG. 26 includes a second brightness difference number calculating portion 440, a second number comparing portion 442, and an end frame searching portion 444.

The text area verifying unit 248A of FIG. 26 may perform operations 176, 178, and 180 of FIG. 13.

The second brightness difference number calculating portion 440 performs operation 176. That is, the second brightness difference number calculating portion 440 inputs a t-th frame and a (t+N)-th frame from the frame inputting unit 240 through an input terminal IN12 in response to a signal inputted by the second text area detecting unit 246 through an input terminal IN11 that represents whether determining the text area is completed. In this case, the second brightness difference number calculating portion 440 calculates the number NB2 of brightness differences greater than an eleventh threshold value TH11 among brightness differences which are differences between brightness values of pixels in the text area determined in the t-th frame and brightness values of pixels in the text area of the (t+N)-th frame corresponding to the text area determined in the t-th frame, as given by Equation 6 and outputs the calculated results to the second number comparing portion 442.

To perform operation 178, the second number comparing portion 442 compares the number NB2 of the brightness differences greater than the eleventh threshold value TH11 with a twelfth threshold value TH12 and outputs the compared results to the end frame searching portion 444. In this case, as described above, when there is the text area in the next frame, the number NB2 of the brightness differences is not greater than the twelfth threshold value TH12.

In order to perform operation 180, upon recognizing from the compared results of the second number comparing portion 442 that the number NB2 of the brightness differences is greater than the twelfth threshold value TH12, that is, if it is recognized that there is no text area in the next fame, the end frame searching portion 444 searches for an end frame in which text associated with video ends.

Figure 27:
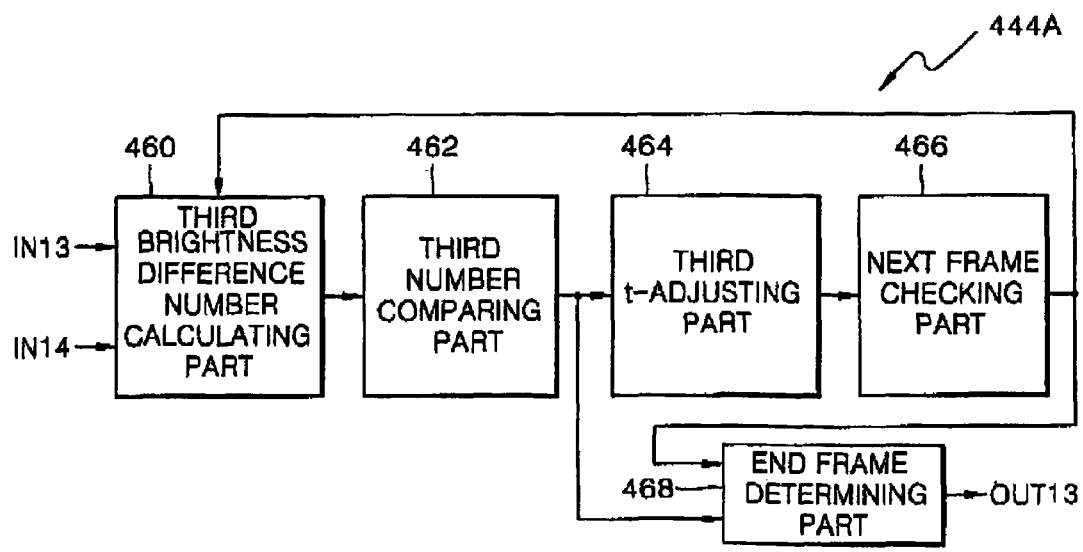
FIG. 27 is a block diagram of an end frame searching portion of FIG. 26 according to an embodiment of the present invention.

FIG. 27 is a block diagram of the end frame searching portion 444 of FIG. 26 according to an embodiment 444A of the present invention. The end frame searching portion 444A includes a third brightness difference number calculating part 460, a third number comparing part 462, a third t-adjusting part 464, a next frame checking part 466, and an end frame determining part 468.

The end frame searching portion 444A of FIG. 27 may perform operation 180A of FIG. 15.

The third brightness difference number calculating part 460 performs operation 200 of FIG. 15. That is, if it is recognized from the compared results inputted by the second number comparing portion 442 through an input terminal IN13 that the number NB2 of the brightness differences is greater than the twelfth threshold value TH12, the third brightness difference number calculating part 460 inputs a t-th frame and a (t+1)-th frame from the frame inputting unit 240 through an input terminal IN14. In this case, the third brightness difference number calculating part 460 calculates the number NB3 of brightness differences greater than an eleventh threshold value TH13 among brightness differences which are differences between brightness values of pixels in the text area determined in the t-th frame and brightness values of pixels in the text area of the (t+1)-th frame corresponding to the text area determined in the t-th frame, according to Equation 7 and outputs the calculated number NB3 of the brightness differences to the third number comparing part 462.

To perform operation 202, the third number comparing part 462 compares the number NB3 of the brightness differences greater than the thirteenth threshold value TH13 with a fourteenth threshold value TH14 and outputs the compared results to the third t-adjusting part 464.

To perform operation 204, upon recognizing from the compared results of the third number comparing part 462 that the number NB3 of the brightness differences is greater than the fourteenth threshold value TH14, the third t-adjusting part 464 increases a value of t by 1 and outputs the increased value of t to the next frame checking part 466.

To perform operation 206, the next frame checking part 466 checks whether the t-th frame adjusted by the third t-adjusting part 464 is the next frame and outputs the checked results to the end frame determining part 468.

Upon recognizing, from the checked results of the next frame checking part 466, that the t-th frame is not the next frame, the third brightness difference number calculating part 460 calculates the number NB3 of the brightness differences.

The end frame determining part 468 performs operations 208 and 210. In order to perform operation 210, upon recognizing from the compared results of the third number comparing part 462 that the number NB3 of the brightness differences is greater than the fourteenth threshold value TH14, the end frame determining part 468 sets the t-th frame as an end frame and outputs the determined results through an output terminal OUT13. In addition, in order to perform operation 208, if it is determined from the checked results of the next frame checking part 466 that the t-th frame is the next frame, the end frame determining part 468 sets a (t+N−1)-th frame as the end frame and outputs the determined results through an output terminal OUT13.

As described above, operation 16A of FIG. 13 alternatively does not include operation 180. Similarly, the text area verifying unit 248A of FIG. 26 alternatively does not include the end frame searching portion 444.

Alternatively to the aspect of the present invention illustrated in FIG. 17, when the text area verifying unit 248 completes verifying whether there is the text area in the next frame, the second text area detecting unit 246 performs an operation of detecting the text area from the remaining area of the current frame. Alternatively, the second text area detecting unit 246 performs an operation of detecting the text area from the remaining area of the current frame and the text area verifying unit 248 performs an operation of verifying whether there is the text area in the next fame at the same time.

The end frame checking unit 250 of FIG. 17 performs operation 18 of FIG. 1. That is, the end frame checking unit 250 of FIG. 17 inputs the current frame from the frame inputting unit 240 in response to a signal inputted by the first text area detecting unit 244 that represents whether detecting the text area is completed or a signal inputted by the text area verifying unit 248 that represents whether verifying the text area is completed. In this case, the end frame checking unit 250 checks whether the inputted current frame is an end frame of the moving frame and outputs the checked results to the first t-adjusting unit 252 as a second control signal C2. For example, after the first text area detecting unit 244 performs operation 14 or the second text area detecting unit 246 and the text area verifying unit 248 perform operation 16, the end frame checking unit 250 checks whether the current frame is an end frame of the video.

To perform operation 20, upon recognizing from the second control signal C2 inputted by the end frame checking unit 250 that the current frame is not the end frame of the video, the first t-adjusting unit 252 increases t by a value of N and outputs the increased value of t to the frame inputting unit 240. In this case, the frame inputting unit 240 reads a new t-th frame as the current frame through an input terminal IN1 when the adjusted t is inputted from the first t-adjusting unit 252.

Thus, the method and apparatus for detecting text associated with video according to aspects of the present invention can be used when the video is summarized, or searched for using the text. For example, an aspect of the present invention can be applied when only news containing a significant text is searched, or the news is abstracted, and summarized, since the text can be quickly and accurately detected. According to another aspect of the present invention a computer-readable program which controls a computer system to execute detecting text associated with video may be stored in a computer readable storage.

As described above, in the method and apparatus for detecting text associated with video according to aspects of the present invention, a text area is detected only from the remaining area of a current frame excluding a text area detected from the previous frame such that unnecessary calculations are prevented and the time required for calculations is reduced. In addition, the text area is detected using a brightness difference between frames such that the text area is quickly detected even in an environment in which a text area is in a complicated background or when a background area is quickly changed. Furthermore, since both gradient and weighted values are used when an edge density is calculated, a problem with conventional methods and apparatus using an edge filter and incapable of distinguishing rapid brightness changes and smooth brightness changes using only gradient values when calculating an edge density is overcome. Accordingly, a text candidate block having a smooth brightness change is prevented from being determined as a character block, and the text area is accurately detected.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a text associated with video, the method comprising:
   reading a t-th frame (where t is a positive integer) among frames forming the video as a current frame;
   determining whether there is a text area detected from a previous frame which is a (t−N)-th (where N is a positive integer) frame among the frames forming the video, in the current frame;
   upon determining that there is no text area detected from the previous frame in the current frame, detecting the text area in the entire current frame; and
   upon determining that there is the text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video, wherein the detecting of the text area from the current frame comprises detecting a character block from the current frame, determining whether the current frame is a text frame, using the detected character block, and upon determining that the current frame is the text frame, post-processing the text frame and determining a text area from the text frame.

2. The method of claim 1, further comprising:

after the text area is detected or verified, determining whether the current frame is an end frame of the video, and upon determining that the current frame is not the end frame of the video, increasing t by a value of N and reading the current frame.

3. The method of claim 1, wherein the detecting of the character block comprises:

obtaining a brightness difference between each pixel of the current frame and each pixel of the next frame, the pixels being placed in the same position, and determining a pixel of the current frame used in obtaining a brightness difference less than a first threshold value as a text candidate pixel, dividing the current frame into sub-blocks having a predetermined size, obtaining the number of text candidate pixels included in each of the sub-blocks, determining a sub-block having the number of a text candidate pixel greater than a second threshold value as a text candidate block, obtaining an edge density of each text candidate block, and determining a text candidate block having the edge density greater than a third threshold value as the character block.

4. The method of claim 3, wherein the edgy density is obtained by dividing summed results of edge gradients of pixels included in the text candidate block by the number of pixels included in the text candidate block.

5. The method of claim 3, wherein the edge density is obtained by dividing a sum of results obtained by multiplying edge gradients of pixels, included in the text candidate block by corresponding weighted values, by the number of pixels included in the text candidate block.

6. The method of claim 5, wherein the weighted value is obtained by dividing the gradient by a maximum value of a gradient that may occur in the text candidate block.

7. The method of claim 1, wherein the determining whether the current frame is the text frame comprises determining whether the number of character blocks included in the current frame is greater than a fourth threshold value, and whether the current frame having the number of the character blocks greater than the fourth threshold value corresponds to the text frame.

8. The method of claim 1, wherein the post-processing of the text frame comprises:

upon determining that the current frame is the text frame, removing an isolated character block in which there is no adjacent character block, from the character block included in the text frame, determining a group of adjacent character blocks in the text frame from which the isolated character block is removed, as a bounding box, obtaining the number of sub-blocks included in each bounding box when the current frame is divided into sub-blocks having a predetermined size, and extracting only a bounding box having the number of sub-blocks greater than a fifth threshold value from bounding boxes included in the text frame, and obtaining an average edge density with respect to each of the extracted bounding boxes and determining a bounding box having an average edge density greater than a sixth threshold value as the text area.

9. The method of claim 8, wherein the determining of the bounding box comprises:

obtaining the number of character blocks included in each row and each column of the text frame from which the isolated character block is removed, selecting a row having the number of character blocks greater than a seventh threshold value and a column having the number of character blocks greater than an eighth threshold value, and determining the bounding box by combining the selected rows with the selected columns, wherein each row and each column are set when the current frame is divided into the sub-blocks.

10. The method of claim 9, wherein the seventh threshold value is the same as the eighth threshold value.

11. The method of claim 9, wherein the determining of the bounding box by combining the selected rows and the selected columns comprises:

determining a portion in which the character blocks are placed continuously in the selected row as a row area, and determining a portion in which the character blocks are placed continuously in the selected column, as a column area, and determining a portion in which the determined row area and the determined column area overlap each other, as the bounding box.

12. The method of claim 8, wherein in the extracting of the bounding box, the bounding box having the number of sub-blocks greater than the fifth threshold value is extracted from the text frame using a connected component labeling method.

13. The method of claim 8, wherein the average edgy density corresponds to an average of edge densities of the sub-blocks included in the extracted bounding boxes.

14. The method of claim 8, wherein the average edge density corresponds to an average of edge densities of the text candidate blocks included in the extracted bounding boxes.

15. The method of claim 8, wherein the average edgy density corresponds to an average of edge densities of the character blocks included in the extracted bounding boxes.

16. The method of claim 1, wherein the detecting of the text area from the current frame further comprises searching for a starting frame, in which text associated with the video starts to be displayed on, among frames from the current frame to a frame prior to the previous frame.

17. The method of claim 16, wherein the searching for the starting frame comprises:

obtaining the number of brightness differences greater than a ninth threshold value among brightness differences which are differences between brightness values of pixels in the text area determined in the t-th frame and brightness values of pixels in the text area of the (t-1)-th frame corresponding to the text area decoded in the t-th frame, determining whether the number of the brightness differences greater than the ninth threshold value is greater than a tenth threshold value, upon determining that the number of the brightness differences greater than the ninth threshold value is greater than the tenth threshold value, -setting the t-th frame as the starting frame upon determining that the number of the brightness differences greater than the ninth threshold value is not greater than the tenth threshold value, reducing t by a value of 1, determining whether the t-th frame is a previous frame, and upon determining that the t-th frame is not the previous frame, proceeding the obtaining the number of the brightness differences, and upon determining that the t-th frame is the previous frame, setting a (t−N+1)-th frame is as the starting frame.

18. A method of detecting a text associated with video, the method comprising:

reading a t-th frame (where t is a positive integer) among frames forming the video as a current frame;

determining whether there is a text area detected from a previous frame which is a (t−N)-th (where N is a positive integer) frame among the frames forming the video, in the current frame;

upon determining that there is no text area detected from the previous frame in the current frame, detecting the text area in the entire current frame; and upon determining that there is the text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video, wherein the detecting of the text area from the remaining area of the current frame comprises:

detecting a character block from the remaining area of the current frame, determining whether the current frame is a text frame based on the remaining area of the current frame, and upon determining that the current frame is the text frame, post-processing the remaining area and determining the text area from the remaining area.

19. A method of detecting a text associated with video, the method comprising:

reading a t-th frame (where t is a positive integer) among frames forming the video as a current frame;

determining whether there is a text area detected from a previous frame which is a (t−N)-th (where N is a positive integer) frame among the frames forming the video, in the current frame;

upon determining that there is no text area detected from the previous frame in the current frame, detecting the text area in the entire current frame; and upon determining that there is the text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video, wherein the determining whether there is the text area in the next frame comprises:

obtaining the number of brightness differences greater than an eleventh threshold value among brightness differences which are differences between brightness values of pixels in the text area determined in the t-th frame and brightness values of pixels in the text area of the (t+N)-th frame corresponding to the text area determined in the t-th frame, and upon determining that the number of the brightness differences greater than the eleventh threshold value is greater than a twelfth threshold value if there is no text area in the next frame, setting the number of the brightness differences greater than the eleventh threshold value as greater than the twelfth threshold value.

20. The method of claim 19 wherein the determining whether there is the text area in the next frame comprises searching for an end frame in which text associated with video ends if it is determined that there is no text area in the next frame.

21. The method of claim 20, wherein the searching for the end frame comprises:

obtaining the number of brightness differences greater than a thirteenth threshold value among brightness differences which are differences between brightness values of pixels in the text area determined in the t-th frame and brightness values of pixels in the text area of the (t+1)-th frame corresponding to the text area determined in the t-th frame, determining whether the number of the brightness differences greater the thirteenth threshold value is greater than a fourteenth threshold value, upon determining that the number of the brightness differences greater than the thirteenth threshold value is greater than the fourteenth threshold value, determining the t-th frame as the end frame, upon determining that the number of the brightness differences greater than the thirteenth threshold value is not greater than the fourteenth threshold value, increasing t by a value of 1, determining whether the t-th frame is the next frame and if it is determined that the t-th frame is not the next frame, obtaining the number of the brightness differences, and upon determining that the t-th frame is the next frame, determining a (t+N−1)-th frame as the end frame.

22. An apparatus for detecting text associated with video, the apparatus comprising:

a frame inputting unit reading a t-th frame (where t is a positive integer) among frames forming the video as a current frame;

a text area checking unit checking whether there is a text area detected from a previous frame which is a (t−N)-th (where N is a positive integer) frame among the frames forming the video, in the current frame and outputting the checked results as a first control signal;

a first text area detecting unit detecting text area from the current frame in response to the first control signal;

a second text area detecting unit detecting text area from a remaining area obtained by excluding an area corresponding to the text area detected from the previous frame from the current frame in response to the first control signal; and a text area verifying unit verifying whether there is a text area in a next frame which is a (t+N)-th frame among the frames forming the video.

23. The apparatus of claim 22, further comprising:

an end frame checking unit checking whether the current frame inputted by the frame inputting unit is an end frame of the video and outputting the checked results as a second control signal in response to a signal inputted by the first text area detecting unit that represents whether detecting the text area is completed and a signal inputted by the text area verifying unit that represents whether verifying the text area is completed; and a first t-adjusting unit increasing t by a value of N and outputting the increased value of t to the frame inputting unit in response to the second control signal.

24. The apparatus of claim 22, wherein the first text area detecting unit comprises:
a first character block detecting portion detecting a character block from the current frame in response to the first control signal,
a first text frame checking portion checking whether the current frame is a text frame using the detected character block and outputting the checked results as a third control signal, and
a first text area determining portion post-processing the text frame and determining a text area from the text frame in response to the third control signal.

25. The apparatus of claim 24, wherein the first character block detecting portion comprises:
a text candidate pixel determining part obtaining a brightness difference between each pixel of the current frame and each pixel of the next frame, the pixels being placed in the same position, and determining a pixel of the current frame used in obtaining a brightness difference less than a first threshold value as a text candidate pixel in response to the first control signal,
a text candidate block determining part dividing the current frame into sub-blocks having a predetermined size, obtaining the number of text candidate pixels included in each of the sub-blocks, and determining a sub-block having the number of a text candidate pixel greater than a second threshold value as a text candidate block, and
a character block determining part obtaining an edge density of each text candidate block and determining text candidate block having an edge density greater than a third threshold value as the character block.

26. The apparatus of claim 24, wherein the first text frame checking portion comprises:
a character block number checking part checking whether the number of character blocks included in the current frame is greater than a fourth threshold value, and
a text frame determining part determining the current frame having the number of character blocks greater than the fourth threshold value as the text frame.

27. The apparatus of claim 24, wherein the first text area determining portion comprises:
an isolated character block removing part removing isolated character block in which there is no adjacent character block, from the character blocks included in the text frame in response to the third control signal,
a bounding box determining part determining a group of adjacent character blocks from the text frame from which the isolated character block is removed, as a bounding box,
a bounding box extracting part obtaining the number of sub-blocks included in each bounding box and extracting the bounding box having the number of sub-blocks greater than a fifth threshold value from the text frame when the current frame is divided into sub-blocks having a certain size, and
a text area extracting part obtaining an average edge density with respect to each of extracted bounding boxes and determining a bounding box having an average edge density greater than a sixth threshold value as the text area.

28. The apparatus of claim 27, wherein the bounding box determining part comprises:
a character block number calculating part calculating the number of character blocks included in each row and each column of the text frame from which the isolated character block is removed,
a row and column selecting part selecting a row having the number of character blocks greater than a seventh threshold value and column having the number of character blocks greater than an eighth threshold value, and
a row and column combining part determining the bounding box by combining the selected rows with the selected columns,
wherein each row and each column are set when the current frame is divided into the sub-blocks.

29. The apparatus of claim 28, wherein the row and column combining part comprises:
an area determining part determining a portion in which character blocks are placed continuously in the selected row, as a row area and determining a portion in which character blocks are placed continuously in the selected column, as a column area, and
an overlapped area checking part determining a portion in which the determined row area and the determined column area overlap each other, as the bounding box.

30. The apparatus of claim 24, wherein the first text area detecting unit further comprises a starting frame searching portion searching for a starting frame in which text associated with the video starts to be displayed, among frames from a current frame to a frame prior to the previous frame in response to a signal inputted by the first text area determining portion that represents whether determining the text area is completed.

31. The apparatus of claim 30, wherein the starting frame searching portion comprises:
a first brightness difference number calculating part obtaining the number of brightness differences greater than a ninth threshold value among brightness differences which are differences between brightness values of pixels in the text area determined in the t-th frame and brightness values of pixels in the text area of the (t−1)-th frame corresponding to the text area determined in the t-th frame in response to a signal inputted by the first text area determining portion that represents whether determining the text area is completed,
a first number comparing part comparing the number of the brightness differences greater than the ninth threshold value with a tenth threshold value and outputting the compared results,
a second t-adjusting part reducing t by a value of 1 in response to the compared results of the first number comparing part,
a previous frame checking part checking whether the t-th frame adjusted by the second t-adjusting part is the previous frame and outputting the checked results; and
a starting frame determining the t-th frame as the starting frame in response to the compared results of the first number comparing part or determining the (t−N+1)-th frame as the starting frame in response to the checked results of the previous frame checking part,
wherein the first brightness difference number calculating part calculates the number of the brightness differences in response to the checked results of the previous frame checking part.

32. The apparatus of claim 22, wherein the second text area detecting unit comprises:
a second character block detecting portion detecting a character block from the remaining area of the current frame in response to the first control signal, a second text frame checking portion checking whether the current frame is text frame using the character block extracted from the remaining area of the current frame and outputting the checked results as a fourth control signal, and a second text area determining portion post-processing the remaining area and determining text area from the remaining area in response to the fourth control signal.

33. The apparatus of claim 22, wherein the text area verifying unit comprises:

a second brightness difference number calculating portion calculating the number of brightness differences greater than an eleventh threshold value among brightness differences which are differences between brightness values of pixels in the text area determined in the t-th frame and brightness values of pixels in the text area of the (t+N)-th frame corresponding to the text area determined in the t-th frame in response to a signal inputted by the second text area detecting unit that represents whether determining the text area is completed, and a second number comparing portion comparing the number of the brightness differences greater than the eleventh threshold value with a twelfth threshold value, wherein when there is text area in the next frame, the number of the brightness differences greater than the eleventh threshold value is not greater than the twelfth threshold value.

34. The apparatus of claim 33, wherein the text area verifying unit further comprises an end frame searching portion searching for an end frame in which text associated with the video ends, in response to the compared results of the second number comparing portion.

35. The apparatus of claim 34, wherein the end frame searching portion comprises:

a third brightness difference number calculating part obtaining the number of brightness differences greater than a thirteenth threshold value among brightness differences which are differences between brightness values of pixels in the text area determined in the t-th frame and brightness values of pixels in the text area of the (t+1)-th frame corresponding to the text area determined in the t-th frame in response to the compared results of the second number comparing portion, a third number comparing part comparing the number of the brightness differences greater than the thirteenth threshold value with a fourteenth threshold value, a third t-adjusting part increasing t by a value of 1 in response to the compared results of the third number comparing part, a next frame checking part checking whether the t-th frame adjusted by the third t-adjusting part is the next frame and outputting the checked results; and an end frame determining part determining the t-th frame as the end frame in response to the compared results of the third number comparing part or setting the (t+N−1)-th frame as the end frame in response to the checked results of the next frame checking part, the third brightness difference number calculating part calculates the number of the brightness differences in response to the checked results of the next frame checking part.

36. A method of detecting a text associated with a video, comprising:

detecting the text area from a remaining area obtained by excluding from a current frame an area corresponding to the text area detected from a previous frame; and verifying whether there is a text area in a next frame which is a (t+N)-th frame among the frames forming the video, wherein the detecting the text area comprises:

detecting a character block from the remaining area of the current frame, determining whether the current frame is a text frame based on the remaining area of the current frame, and upon determining that the current frame is the text frame, post-processing the remaining area and determining the text area from the remaining area.

37. An apparatus for detecting text associated with video, the apparatus comprising:

a first text area detecting unit detecting a first text area from a current frame in response to a first control signal;

a second text area detecting unit detecting a second text area from a remaining area obtained by excluding an area corresponding to the first text area detected from the previous frame from the current frame in response to a first control signal; and a text area verifying unit verifying whether there is a text area in a next frame which is a (t+N)-th frame among the frames forming the video, wherein the first text area detecting unit comprises:

a first character block detecting portion detecting a character block from the current frame in response to the first control signal, a first text frame checking portion checking whether the current frame is a text frame using the detected character block and outputting the checked results as a third control signal, and a first text area determining portion post-processing the text frame and determining a text area from the text frame in response to the third control signal.

38. An apparatus for detecting a text associated with video, comprising:

an isolated character block removing part removing an isolated character block in which there is no adjacent character block, from the character blocks included in a text frame in response to a control signal;

a bounding box determining part determining a group of adjacent character blocks from the text frame, from which the isolated character block is removed, as a bounding box;

a bounding box extracting part obtaining a number of sub-blocks included in each bounding box and extracting the bounding box having the number of sub-blocks greater than a first threshold value from the text frame when the current frame is divided into sub-blocks having a certain size; and a text area extracting part obtaining an average edge density with respect to each of extracted bounding boxes and determining a bounding box having an average edge density greater than a second threshold value as the text area.

39. The apparatus of claim 38, wherein the bounding box determining part comprises:

a character block number calculating part calculating a number of character blocks included in each row and each column of the text frame from which the isolated character block is removed, a row and column selecting pad selecting a row having the number of character blocks greater than a third threshold value and column having the number of character blocks greater than an fourth threshold value, and a row and column combining part determining the bounding box by combining the selected rows with the selected columns, wherein each row and each column are set when the current frame is divided into the sub-blocks.

40. The apparatus according to claim 39, wherein the row and column combining part comprises:

an area determining part determining a portion in which character blocks are placed continuously in the selected row, as a row area and determining a portion in which character blocks are placed continuously in the selected column, as a column area, and an overlapped area checking pad determining a portion in which the determined row area and the determined column area overlap each other, as the bounding box.

41. A computer-readable storage storing a computer-readable program which controls a computer system to execute detecting text associated with video, by:

reading a t-th frame (where t is a positive integer) among frames forming the video as a current frame;

determining whether there is a text area detected from a previous frame which is a (t−N)-th (where N is a positive integer) frame among the frames forming the video, in the current frame;

upon determining that there is no text area detected from the previous frame in the current frame, detecting the text area in the entire current frame; and upon determining that there is the text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video, wherein after the text area is detected or verified, determining whether the current frame is an end frame of the video, and upon determining that the current frame is not the end frame of the video, increasing t by a value of N and reading the current frame.

42. A computer-readable storage storing a computer-readable program which controls a computer system to execute detecting text associated with video, by:

reading a t-th frame (where t is a positive integer) among frames forming the video as a current frame;

determining whether there is a text area detected from a previous frame which is a (t−N)-th (where N is a positive integer) frame among the frames forming the video, in the current frame;

upon determining that there is no text area detected from the previous frame in the current frame, detecting the text area in the entire current frame;

upon determining that there is the text area detected from the previous frame in the current frame, detecting the text area from a remaining area obtained by excluding from the current frame an area corresponding to the text area detected from the previous frame and verifying whether there is a text area in a next frame which is a (t+N)-th frame among the frames forming the video;

detecting a character block from the current frame;

determining whether the current frame is a text frame, using the detected character block; and upon determining that the current frame is the text frame, post-processing the text frame and determining a text area from the text frame.

* * * * *

UNITED STATES PATENT AND TRADEMARK OFFICE
CERTIFICATE OF CORRECTION

PATENT NO. : 7,446,817 B2
APPLICATION NO. : 11/056361
DATED : November 4, 2008
INVENTOR(S) : Cheolkon Jung et al.

It is certified that error appears in the above-identified patent and that said Letters Patent is hereby corrected as shown below:

Column 22, Line 8, change "19" to --19,--.

Column 24, Line 65, change "signal ,a" to --signal, a--.

Column 26, Line 58, change "pad" to --part--.

Column 27, Line 6, change "pad" to --part--.

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,446,817 B2
APPLICATION NO. : 11/056361
DATED : November 4, 2008
INVENTOR(S) : Cheolkon Jung et al.

Page 1 of 1

It is certified that error appears in the above-identified patent and that said Letters Patent is hereby corrected as shown below:

Column 21, Line 4, change "frame" to --frame,--.

Signed and Sealed this

Tenth Day of March, 2009

JOHN DOLL
*Acting Director of the United States Patent and Trademark Office*